United States Patent
Hong et al.

(10) Patent No.: US 10,009,299 B2
(45) Date of Patent: Jun. 26, 2018

(54) METHOD OF PROCESSING MESSAGE AND ELECTRONIC DEVICE SUPPORTING THE SAME

(71) Applicant: Samsung Electronics Co., Ltd., Gyeonggi-do (KR)

(72) Inventors: Jee Eun Hong, Seoul (KR); Hwa Young Song, Seoul (KR); Jeong Hyun Pang, Gyeonggi-do (KR); Pyo Je Cho, Gyeonggi-do (KR); Geon Soo Kim, Gyeonggi-do (KR); Min Kyung Hwang, Seoul (KR); Jonas Ove Arbsjo, Malmo (SE); Karl-Oskar Plaza Olivestedt, Malmo (SE); Nils Roger Andersson Reimer, Malmo (SE)

(73) Assignee: Samsung Electronics Co., Ltd (KR)

( * ) Notice: Subject to any disclaimer, the term of this patent is extended or adjusted under 35 U.S.C. 154(b) by 244 days.

(21) Appl. No.: 15/141,271

(22) Filed: Apr. 28, 2016

(65) Prior Publication Data
US 2016/0323213 A1  Nov. 3, 2016

(30) Foreign Application Priority Data
Apr. 28, 2015 (KR) .................. 10-2015-0060028

(51) Int. Cl.
*H04L 12/58* (2006.01)

(52) U.S. Cl.
CPC .......... *H04L 51/046* (2013.01); *H04L 51/066* (2013.01)

(58) Field of Classification Search
None
See application file for complete search history.

(56) References Cited

U.S. PATENT DOCUMENTS

| | | | |
|---|---|---|---|
| 7,392,226 B1 * | 6/2008 | Sasaki | G06Q 20/045 705/64 |
| 9,853,926 B2 * | 12/2017 | Tussy | H04L 51/066 |
| 2004/0139162 A1 * | 7/2004 | Adams | G06Q 10/107 709/206 |
| 2009/0141952 A1 * | 6/2009 | Saito | G06F 21/32 382/124 |

(Continued)

FOREIGN PATENT DOCUMENTS

| | | |
|---|---|---|
| KR | 10-2006-0118724 | 11/2006 |
| KR | 10-2006-0132255 | 12/2006 |
| KR | 10-2009-0099410 | 9/2009 |

*Primary Examiner* — Backhean Tiv
(74) *Attorney, Agent, or Firm* — The Farrell Law Firm, P.C.

(57) ABSTRACT

An electronic device is provided. The electronic device includes an input interface configured to receive a user input related to a message, a communication interface configured to transmit the message to an external electronic device, a memory configured to store the message, a display configured to display the message, and a processor functionally connected to the input interface, the communication interface, the memory, and the display. When a first content of the message is input, the processor is configured to seal the message with a first object designated such that at least a portion of a second object corresponding to the first content is not exposed and transmit the sealed message through the communication interface. The at least the portion of the second object is configured to be exposed when an unseal input with respect to the first object occurs.

7 Claims, 32 Drawing Sheets

(56) References Cited

U.S. PATENT DOCUMENTS

| | | | | |
|---|---|---|---|---|
| 2010/0043058 A1* | 2/2010 | Sanders | G06F 21/36 | |
| | | | 726/3 | |
| 2011/0208960 A1* | 8/2011 | Flood | H04L 51/066 | |
| | | | 713/153 | |
| 2015/0163182 A1* | 6/2015 | Chandrasekaran | H04L 51/063 | |
| | | | 709/204 | |
| 2015/0373021 A1* | 12/2015 | Tussy | H04L 63/0428 | |
| | | | 713/170 | |
| 2016/0164854 A1* | 6/2016 | Lerman | H04L 63/08 | |
| | | | 726/4 | |
| 2016/0275279 A1* | 9/2016 | Kunieda | G06F 21/32 | |
| 2016/0323213 A1* | 11/2016 | Hong | H04L 51/046 | |
| 2017/0353326 A1* | 12/2017 | Hashiura | H04L 12/2818 | |

* cited by examiner

FIG.15

METHOD OF PROCESSING MESSAGE AND ELECTRONIC DEVICE SUPPORTING THE SAME

PRIORITY

This application claims priority under 35 U.S.C. § 119(a) to Korean Patent Application Serial No. 10-2015-0060028, which was filed on Apr. 28, 2015 in the Korean Intellectual Property Office, the entire disclosure of which is incorporated herein by reference.

BACKGROUND

1. Field of the Disclosure

The present disclosure relates to a method of processing a message, and more particularly, to a method of processing a message, which seals at least one content through at least one seal stage to transmit and receive the message including various kinds of content, and an electronic device supporting the method.

2. Description of the Related Art

An electronic device transmits and receives a message using a variety of applications. For example, the electronic device transmits and receives the message using a short message service (SMS) application, a multimedia message service (MMS) application, or an instant messenger (IM) application. In addition, the electronic device transmits and receives not only a text message but also a massage including image, audio, video content, or combination thereof. For example, the electronic device transmits the message with a file, e.g., image, audio, or video content, attached thereto or transmits a corresponding identifier to transmit an image (e.g., emoticon) mapped with a specified identifier (e.g., keyword).

However, the electronic device is required to use a charged service or a standardized service to transmit the message including various kinds of content (e.g., text, image, icon, audio, video, etc.). In addition, although the image or icon (e.g., sticker) is transmitted based on the existing instant messenger (e.g., IM application) using a communication service with no extra charge, the text and the sticker are individually transmitted, and thus a connectivity between contents of the messages, e.g., between the text and the sticker, is degraded.

SUMMARY

Aspects of the present disclosure have been made to address at least the above-mentioned problems and/or disadvantages and to provide at least the advantages described below. Accordingly, an aspect of the present disclosure is to provide a method of processing a message, which seals at least one content through at least one seal stage to transmit and receive the message including various kinds of content, and an electronic device supporting the method.

In accordance with an aspect of the present disclosure, there is provided an electronic device. The electronic device includes an input interface configured to receive a user input related to a message, a communication interface configured to transmit the message to an external electronic device, a memory configured to store the message, a display configured to display the message, and a processor functionally connected to the input interface, the communication interface, the memory, and the display. When a first content of the message is input, the processor is configured to seal the message with a first object designated such that at least a portion of a second object corresponding to the first content is not exposed and transmit the sealed message through the communication interface. The at least the portion of the second object is configured to be exposed when an unseal input with respect to the first object occurs.

In accordance with an aspect of the present disclosure, there is provided an electronic device. The electronic device includes a communication interface configured to receive a sealed message including a first object and a second object from an external electronic device, a memory configured to store the sealed message, a display configured to display the sealed message, an input interface configured to receive a user input related to the sealed message, and a processor functionally connected to the communication interface, the memory, the display, and the input interface. The processor is configured to maintain a display state of at least a portion of the second object which is not exposed by the first object and expose at least the portion of the second object when an unseal input with respect to the first object occurs.

In accordance with an aspect of the present disclosure, there is provided a method of processing a message using an electronic device. The method includes receiving a user input related to a message, when a first content of the message is input, sealing the message with a first object designated such that at least a portion of a second object corresponding to the first content is not exposed, and transmitting the sealed message to an external electronic device. The at least the portion of the second object is configured to be exposed when an unseal input with respect to the first object occurs.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIG. 15 is a diagram showing a screen related to designation of a time to confirm a message, according to an embodiment of the present disclosure;

Throughout the drawings, it should be noted that like reference numbers are used to depict the same or similar elements, features, and structures.

DETAILED DESCRIPTION

Figure 1:
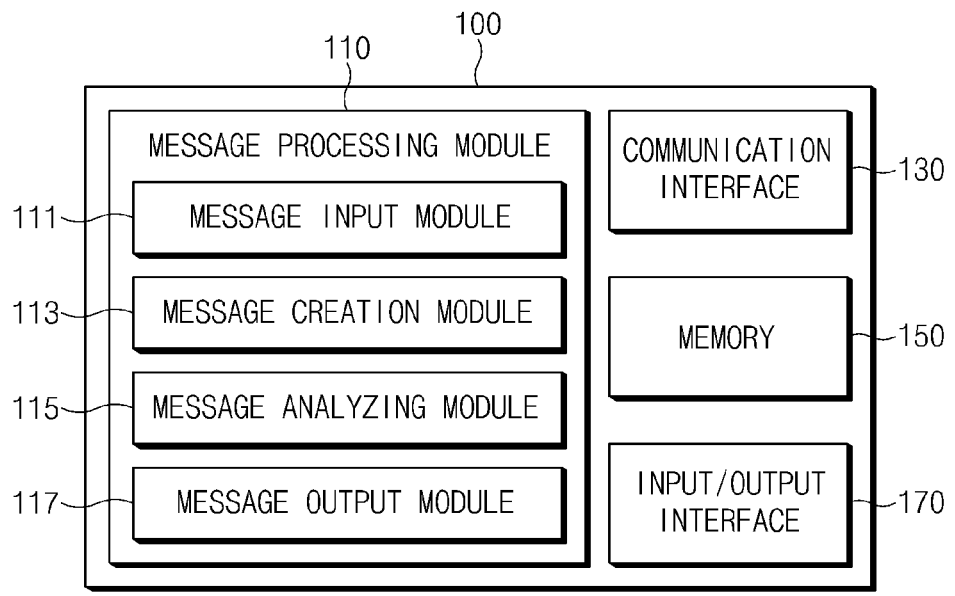
FIG. 1 is a diagram illustrating an electronic device configured for message processing, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The term "module" as used herein may be defined as, for example, a unit including one of hardware, software, and firmware or two or more combinations thereof. The term "module" may be interchangeably used with, for example, the terms "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart mirrors, smart bands, smart watches, and the like.

According to various embodiments, the electronic device may be smart home appliances. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles (e.g., Xbox™ and PlayStation™), electronic dictionaries, electronic keys, camcorders, electronic picture frames, and the like.

According to various embodiments, the electronic device may include at least one of medical devices (e.g., various portable medical measurement devices, such as a blood glucose monitoring device, a heartbeat measuring device, a blood pressure measuring device, a body temperature measuring device, and the like), a magnetic resonance angiography (MRA) device, a magnetic resonance imaging (MRI) device, a computed tomography (CT) device, scanners, ultrasonic devices, navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller machines (ATMs), points of sales (POSs) devices, or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like) devices.

According to various embodiments, the electronic device may include at least one of furniture or buildings/structures, electronic boards, electronic signature receiving devices, projectors, or various measuring instruments, such as, water meters, electricity meters, gas meters, or wave meters, and the like. The electronic devices may be one or more combinations of the above-mentioned devices. According to a certain embodiment of the present disclosure, an electronic device may be a flexible electronic device. Also, electronic devices are not limited to the above-mentioned devices, and may include new electronic devices according to the development of new technologies.

Hereinafter, electronic devices according to various embodiments of the present disclosure will be described with reference to the accompanying drawings. The term "user" used herein may refer to a person who uses an electronic device or may refer to a device (e.g., an artificial intelligence electronic device) that uses an electronic device.

FIG. 1 is a diagram illustrating an electronic device configured for message processing, according to an embodiment of the present disclosure.

Referring to FIG. 1, an electronic device 100 includes a message processing module 110, a communication interface 130, a memory 150, and an input/output interface 170. The message processing module 110 may input, transmit, receive, and output a message, and the message processing module 110 may include a message input module 111, a message creation module 113, a message analyzing module 115, and a message output module 117. According to various embodiments, at least one component of the electronic device 100 may be omitted from the electronic device 100, or additional components may be added to the electronic device 100. As an example, the electronic device 100 may include a processor.

The processor may include one or more of a central processing units (CPUs), an application processor (AP), or a communication processor (CP). The processor may control at least one component of the electronic device 100 and/or calculate or process data of a communication. According to various embodiments, the processor may include the message processing module 110 or may be independent from the message processing module 110.

The message input module 111 may receive a user input related to a generation of a message through the input/output interface 170. For example, the message input module 111 may receive the user input generated during the execution of a message application (e.g., SMS application, MMS application, or IM application). According to various embodiments, the message input module 111 may receive a text input, a content selection input (e.g., a sticker selection input), a seal function selection input (e.g., a seal button selection input), or information related to seal (hereinafter, referred to as seal-related information).

According to various embodiments, the message input module 111 may transmit a related event to the message processing module 110 to allow a corresponding screen to be configured and displayed in accordance with the input message applied thereto. For example, the message input module 111 may transmit the related event to the message processing module 110 to allow a screen, through which the user selects the content, to be displayed in response to the seal button selection input applied thereto. The message processing module 110 may configure the corresponding screen and display the configured screen through the input/output interface 170. In addition, the message input module 111 may transmit content, such as a text, an image, an icon (e.g., a sticker), an audio, or a video, extracted from the input message or the seal-related information.

The message creation module 113 may generate the message based on the content and the seal-related information. For example, the message creation module 113 may combine the input text or the selected content information with the seal-related information to generate a sealed message. In this regard, the seal-related information may include client information used to seal the message, information on message confirmation time, or information on receiving terminal designation in each seal stage.

According to various embodiments, the message creation module 113 may transmit a related event to the message processing module 110 to transfer a generated message. For example, the message creation module 113 may generate the message based on the content and the seal-related information provided from the message input module 111 in response to a message transmission button selection and may transmit a message generation completion event or a message transmission event to the message processing module 110. The message processing module 110 may transmit the generated message to a receiving terminal through the communication interface 130. According to various embodiments, the message creation module 113 may store the generated message into the memory 150. The message processing module 110 may transmit the message stored in the memory 150 to the receiving terminal in response to the message transmission event.

According to various embodiments, the message processing module 110 may receive the message through the communication interface 130. In addition, the message processing module 110 may transmit a message receiving event or the received message to the message analyzing module 115 when the message processing module 110 receives the message. According to various embodiments, the message processing module 110 may store the message into the memory 150 when receiving the message. The message processing module 110 may transmit the message receiving event to the message analyzing module 115, and the message analyzing module 115 may analyze the message stored in the memory 150 in response to the message receiving event.

The message analyzing module 115 may analyze the message. For example, the message analyzing module 115 may determine whether the message is a sealed message. In addition, if the message is sealed, the message analyzing module 115 may extract sealed content and seal-related information in each seal stage. For instance, the message analyzing module 115 may separate at least one display object and at least one message object from the sealed message and may extract the seal-related information set in each seal stage. In this regard, the display object (e.g., a first object) may include the text, image, icon, audio, or video as an object to seal the message object (e.g., a second object). In addition, similar to the display object (e.g., the first object), the message object (e.g., the second object) may include the text, image, icon, audio, or video as an object to be sealed. In the case that the message is sealed through at least one seal state, a previous message object may be designated as the display object sealing a next message object. For example, a first message object (e.g., a second object) that is sealed first may be designated as a second display object sealing a second message object (e.g., a third object) that is to be sealed following the first message object.

According to various embodiments, the message analyzing module 115 may transmit the extracted display object, the extracted message object, or the seal-related information to the message output module 117. In the case that the display object is provided as an identifier of the content, the message analyzing module 115 may transmit the identifier to the message output module 117 or may search the content (e.g., sticker) mapped with the identifier in the memory 150 to transmit the searched content to the message output module 117.

The message output module 117 may output the display object and the message object through the input/output interface 170. For example, the message output module 117 may output the display object and the message object through a display or an audio output device in accordance with a type of the display object and the message object. In the case where the received message is a sealed message, the message output module 117 may output the display object at least until a user input with respect to the message is received. In addition, in the case that the user input with respect to the message is an input of unseal, the message output module 117 may control to output the message object. In this case, the message output module 117 may refer to the seal-related information. For example, in the case that the message confirmation time information is included in the seal-related information included in the message, the message output module 117 may output the message object based on the message confirmation time information. In addition, in the case that the client information is included in the seal-related information, the message output module 117 may select an output device based on the client information and may control to output the message object.

According to various embodiments, the message output module 117 may output the sealed content to correspond to a corresponding unseal input or a corresponding seal input in each seal stage. For example, the message output module 117 may output the display object when the message output module 117 receives the sealed message. In addition, the message output module 117 may sequentially output at least one message object included in the message in response to the unseal input received in each seal stage. Similarly, the message output module 117 may reversely output at least one message object included in the message in response to the seal input received in each seal stage.

The communication interface 130 may set a communication between the electronic device 100 and an external electronic device. For example, the communication interface 130 may be connected to a network via a wireless or wired communication to communicate with the external electronic device.

The memory 150 stores commands or data related to at least one other component of the electronic device 100. The memory 150 stores messages generated or received in association with a message application.

The input/output interface 170 serves as an interface to transmit the commands or data provided from the user or other external devices to the other component(s) of the electronic device 100. For example, the input/output interface 170 receives the user input related to the generation of the message and transmits the user input to the message processing module 110. In addition, the input/output interface 170 outputs commands or data provided from other component(s) of the electronic device 100 to the user or other external devices. For example, the input/output interface 170 outputs content selection screen data or message data provided from the message processing module 110.

Figure 2:
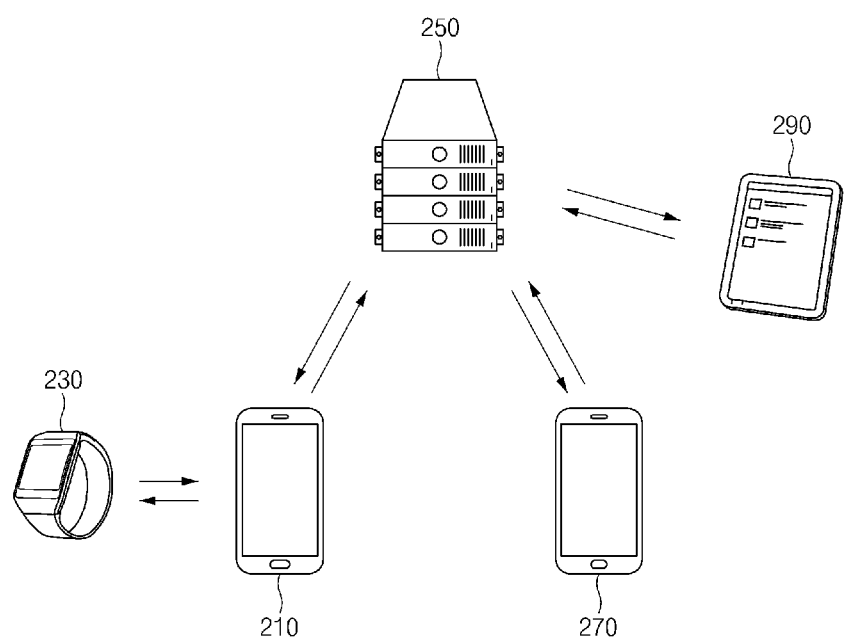
FIG. 2 is a diagram illustrating an electronic device configured for message processing in a network environment, according to an embodiment of the present disclosure.

FIG. 2 is a diagram illustrating an electronic device configured to process a message in a network environment, according to an embodiment of the present disclosure.

Referring to FIG. 2, a first electronic device 210 may have the same or similar configuration as that of the electronic device 100 shown in FIG. 1. For example, the first electronic device 210 may be an electronic device that transmits and receives a message to and from external electronic devices (e.g., a first external electronic device 270 and a second external electronic device 290) in a network environment.

A second electronic device 230 may be an electronic device that is the same as or different from the first electronic device 210. The second electronic device 230 may be connected to the first electronic device 210 via a wired/wireless communication network and may be operated independent from or in conjunction with the first electronic device 210. According to various embodiments, all or a portion of operations executed in the first electronic device 210 may be performed in the second electronic device 230. For example, the second electronic device 230 may transmit and receive a message to and from the external electronic device independent from the first electronic device 210 or through the first electronic device 210. In addition, the second electronic device 230 may independently output the message without being controlled by the first electronic device 210 or may output the message in accordance with an output control of the first electronic device 210. According to various embodiments, the second electronic device 230 may be, but is not limited to, a wearable electronic device. In addition, the second electronic device 230 may receive at least a portion of information (e.g., a portion of content) of the message provided to the first electronic device 210 and output the received portion of the information of the message.

A server 250 may transmit the message to a receiving terminal from a transmitting terminal. In the case that the first electronic device 210 serves as the transmitting terminal to transmit a specific message to the first external electronic device 270 serving as the receiving terminal, the server 250 may receive a message transmission request from the first electronic device 210. In addition, the server 250 may analyze the receiving terminal designation information of the message and transmit the message to the first external electronic device 270 corresponding to the receiving terminal designation information.

In the case that the message provided from the transmitting terminal is a sealed message, the server 250 may determine whether the receiving terminal is an electronic device capable of processing the sealed message. For example, the server 250 may determine whether the receiving terminal is an electronic device capable of processing the sealed message based on the information of the receiving terminal (e.g., platform version information or message application version information). Alternatively, the server 250 may determine whether the receiving terminal is an electronic device capable of processing the sealed message based on the message transmission response obtained by transmitting the sealed message to the receiving terminal.

In the case that the receiving terminal is an electronic device that is not capable of processing the sealed message, the server 250 may reprocess and transmit the sealed message. The server 250 may separate the sealed message and transmit the separated sealed message to the receiving terminal. For example, the server 250 may separate at least one display object and at least one message object, which are included in the sealed message, from each other in each seal stage and transmit the separated display object and message object to the receiving terminal. According to various embodiments, the server 250 may include one or more server groups.

Each of the first external electronic device 270 and the second external electronic device 290 may be an electronic device that is the same as or different from the first electronic device 210. The first external electronic device 270 or the second external electronic device 290 may transmit and receive the message to and from the first and second electronic devices 210 and 230. In addition, when the first external electronic device 270 or the second external electronic device 290 receives a message, the first external electronic device 270 or the second external electronic device 290 may analyze and output the message. According to various embodiments, the first electronic device 210 or the second electronic device 230 may be directly connected to the first and second external electronic devices 270 and 290 without passing through the server 250 to communicate with the first and second external electronic devices 270 and 290.

As described above, according to various embodiments, the electronic device may include the input/output interface that receives the user input related to the generation of the message and outputs the message and the message processing module that seals the second object corresponding to the content of the input message with the designated first object such that at least a portion of the second object is not exposed.

According to various embodiments, the first and second objects may include at least one of the text, image, icon, audio, or video.

According to various embodiments, the message processing module may control to output the second object in the case where the user input designated as the input of the unseal with respect to the first object is received and may control to output the first object in the case where the user input designated as the input of a seal with respect to the second object is received.

According to various embodiments, the message processing module may control to output the screen selecting the first object in the case where the user input designated as the seal input with respect to the message input object, in which the message content may be input, is received.

According to various embodiments, the message processing module may place the content included in the screen selecting the first object in various positions based on at least one of the type of the second object, the content of the second object, the use historical information of the seal function, or user context information.

According to various embodiments, the message processing module may allow the client information, which includes at least one of the receiving terminal designation information or the electronic device designation information when the message is sealed, to be included in the message and may select the output device used to output at least one of the first object or the second object included in the message based on the client information included in the message when the message is received.

According to various embodiments, the message processing module may allow the message confirmation time information, which includes at least one of a message confirmation start time or a message confirmation end time when the message is sealed, to be included in the message and may determine whether to output at least one of the first object or the second object included in the message based on the message confirmation time information.

According to various embodiments, in the case that the message confirmation start time does not come, the message processing module may control not to output the second object even though the user input designated as the unseal input with respect to the first object is received, in the case that the user input designated as the unseal input with respect to the first object is not received, the message processing module may control not to output the second object even though the message confirmation start time comes, or in the case that the message confirmation start time comes, the message processing module may control to output the second object regardless of whether the user input designated as the unseal input with respect to the first object is received.

According to various embodiments, in the case that the message confirmation end time is expired, the message processing module may control not to output the second object even though the user input designated as the unseal input with respect to the first object is received, and the message processing module may stop outputting the second object when the message confirmation end time is expired while the second object is output.

According to various embodiments, in the case that the designated user input with respect to the message that is already transmitted is received, the message processing module may transmit at least one of the type of the user input or emphasis effect information designated in accordance with the type of the user input to the receiving terminal of the message together with identification information of the message.

According to various embodiments, the message processing module may apply the designated emphasis effect to the message in the case that at least one of the type of the user input or emphasis effect information designated in accordance with the type of the user input is provided with the identification information of the message from the transmitting terminal of the message with respect to the message that is already received.

According to various embodiments, the electronic device may include the input/output interface that receives the user input related to the generation of the message and outputs the message and the message processing module that seals the second object corresponding to the content of the input message to the designated first object such that at least a portion of the second object is not exposed. In the case that the input corresponding to the content of the second message occurs, the message processing module may seal the third object corresponding to the content of the second message such that at least a portion of the third object is not exposed due to at least one of the first object or the second object.

According to various embodiments, in the case that the user input designated as the unseal input with respect to the first object is received, the message processing module may control to output the second object, and in the case that the user input designated as the unseal input with respect to the second object is received, the message processing module may control to output the third object.

According to various embodiments, in the case that the user input designated as the seal input with respect to the second object is received, the message processing module may control to output the first object, and in the case that the user input designated as the seal input with respect to the third object is received, the message processing module may control to output at least one of the first object or the second object.

According to various embodiments, the message processing module may allow at least one of first receiving terminal designation information, which is input when the second object is sealed, or second receiving terminal designation information, which is input when the third object is sealed, to be included in the receiving terminal designation information included in the message in each seal stage. The message processing module may select the output device that outputs at least one of the first object, the second object, or the third object included in the message based on the receiving terminal designation information in each seal stage included in the message.

According to various embodiments, an electronic device may include an input interface that receives a user input related to a message, a communication interface that transmits the message to an external electronic device, a memory that stores the message, a display that displays the message, and a processor functionally connected to the input interface, the communication interface, the memory, and the display. When a first content of the message is input, the processor may seal the message with a first object designated such that at least a portion of a second object corresponding to the first content is not exposed and transmit the sealed message through the communication interface. The at least the portion of the second object may be exposed when an unseal input with respect to the first object occurs.

According to various embodiments, the first object and the second object may comprise a display object corresponding to at least one of a text, an image, an audio, and a video.

According to various embodiments, the processor may include client information comprising at least one of receiving terminal designation information indicating at least one electronic device is allowed to receive the sealed message and output device designation information indicating at least one output device which output the sealed message in the sealed message.

According to various embodiments, the at least one output device may include at least one electronic device among electronic devices owned by a user of the external electronic device.

According to various embodiments, the processor may include message confirmation time information comprising at least one of a message confirmation start time and a message confirmation end time in the sealed message.

According to various embodiments, when a user input with respect to the sealed message which is already transmitted to the external electronic device occurs, the processor may transmit at least one of a type of the user input and emphasis effect information designated in accordance with the type of the user input to the external electronic device with identification information of the sealed message.

According to various embodiments, when a second content of the message is input, the processor may seal the sealed message with at least one of the first object and the second object such that at least a portion of a third object corresponding to the second content is not exposed.

According to various embodiments, an electronic device may include a communication interface that receives a sealed message including a first object and a second object from an external electronic device, a memory that stores the sealed message, a display that displays the sealed message, an input interface that receives a user input related to the sealed message, and a processor functionally connected to the communication interface, the memory, the display, and the input interface. The processor may maintain a display state of at least a portion of the second object which is not exposed by the first object and expose at least the portion of the second object when an unseal input with respect to the first object occurs.

According to various embodiments, the processor may conceal at least the portion of the second object when a seal input with respect to the second object occurs.

According to various embodiments, when the sealed message includes client information comprising at least one of receiving terminal designation information indicating at least one electronic device is allowed to receive the sealed message and output device designation information indicating at least one output device which output the sealed message, the processor may determine at least one of output of the sealed message based on the receiving terminal designation information and selection of the at least one output device outputting the sealed message based on the output device designation information.

According to various embodiments, when the sealed message includes message confirmation time comprising at least one of a message confirmation start time and a message confirmation end time, the processor may determine output of the sealed message based on the message confirmation time.

According to various embodiments, the processor may perform at least one of determination that at least the portion of the second object is not exposed when the message confirmation start time is does not come even though the unseal input with respect to the first object occurs, determination that at least the portion of the second object is not exposed when the unseal input with respect to the first object does not occur even though the message confirmation start time comes, and determination that at least the portion of the second object is exposed when the message confirmation start time comes regardless of whether the unseal input with respect to the first object occurs.

According to various embodiments, the processor may perform at least one of determination that at least the portion of the second object is not exposed when the message confirmation end time is expired even though the unseal input with respect to the first object occurs, and determination that at least the portion of the second object is concealed when the message confirmation end time is expired while the second object is exposed.

According to various embodiments, when at least one of a type of a user input with respect to the sealed message which is already received from the external electronic device and emphasis effect information designated in accordance with the type of the user input is received with identification information of the sealed message, the processor may apply the emphasis effect to the sealed message.

Figure 3:
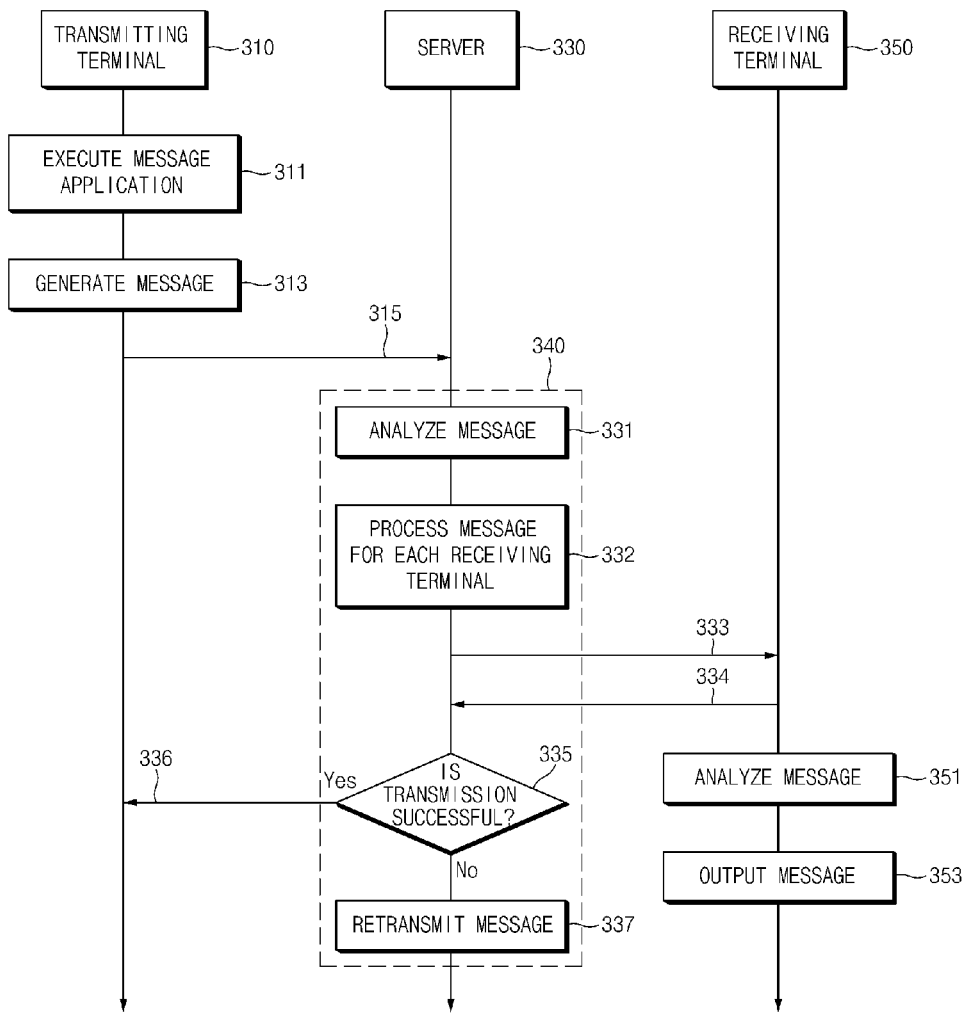
FIG. 3 is a flowchart illustrating a message processing flow of a system related to message processing, according to an embodiment of the present disclosure.

FIG. 3 is a flowchart illustrating a message processing flow of a system related to message processing, according to an embodiment of the present disclosure.

Referring to FIG. 3, a transmitting terminal 310 executes the message application in operation 311. The transmitting terminal 310 may configure a screen for running various functions, such as a message historical information confirmation, a message generation, a message reception, etc., and output the screen for running the various functions. The transmitting terminal 310 may receive an input related to the message generation from the user. For example, the transmitting terminal 310 may receive a content (e.g., text) corresponding to the content of the message as the message object. In addition, the transmitting terminal 310 may select a content as a display object for sealing the message object and receive the seal-related information.

In operation 313, the transmitting terminal 310 generates a message using at least one message object input thereto. In the case that the display object is selected, the transmitting terminal 310 may generate the message by combining the display object, the message object, and the seal-related information.

In operation 315, the transmitting terminal 310 requests the message transmission to the server 330. According to various embodiments, the server 330 may receive a message, to be transmitted, from the transmitting terminal 310 and transmit the message to a receiving terminal 350 through a message processing operation 340 at the server end. According to various embodiments, the transmitting terminal 310 may directly transmit the message to the receiving terminal 350 in the operation 315 instead of requesting the message transmission to the server 330. In addition, the server 330 may omit all or a portion of the message processing operation 340 at the server end and may perform an additional operation.

In operation 331, the server 330 analyzes the message. The server 330 may confirm the receiving terminal designation information included in the message. As another example, the server 330 may determine whether the message is the sealed message.

In the case that the message is a sealed message, the server 330 may process the message for each receiving terminal in operation 332. For example, the server 330 may determine whether the receiving terminal is the electronic device capable of processing the sealed message. In the case that the receiving terminal is the electronic device incapable of processing the message (e.g., the receiving terminal does not include specified module (e.g., the message processing module 110) configured to receive, analyze, and output the sealed message, or a processor included in the receiving terminal does not have specific function related to processing the sealed message), the server 330 may reprocess the message. As an example, the server 330 may separate the content (e.g., at least one display object and at least one message object) included in the message and reprocess the message in a form that is able to be confirmed by the receiving terminal 350. According to various embodiments, the server 330 may process the separated content into individual messages and transmit the individual messages to the receiving terminal 350. As another way, the server 330 may transmit the separated content after setting a text of the separated content to a message body and reprocessing other content of the separated content as an attached file.

In operation 333, the server 3330 transmits the message or the message obtained by reprocessing the message to the receiving terminal 350 in accordance with the receiving terminal designation information. In operation 334, the receiving terminal 350 transmits a transmission response with respect to the message provided from the server 330 to the server 330. According to various embodiments, the server 330 may determine whether the receiving terminal 350 is the electronic device capable of processing the sealed message or not based on the message transmission response. In addition, in the case that the message is transmitted to the receiving terminal 350 from the transmitting terminal 310 without passing through the server 330, the operation 334 may be executed by the message transmission response from the receiving terminal 350 to the transmitting terminal 310. When the receiving terminal 350 receives the message or the reprocessed message, the receiving terminal 350 analyzes the message received in operation 351. In addition, the receiving terminal 350 may output the received message based on the analyzed information in operation 353.

In operation 335, the server 330 determines whether the message transmission is successful based on the message transmission response. In the case that the message is transmitted successfully, the server 330 may transmit a message transmission success response to the transmitting terminal 310 as operation 336. In the case that the message transmission is failed, the server 330 may retransmit the message to the receiving terminal 350 as operation 337. According to various embodiments, the server 330 may reprocess the message in accordance with the type of the message transmission response before executing the operation 337.

Figure 4:
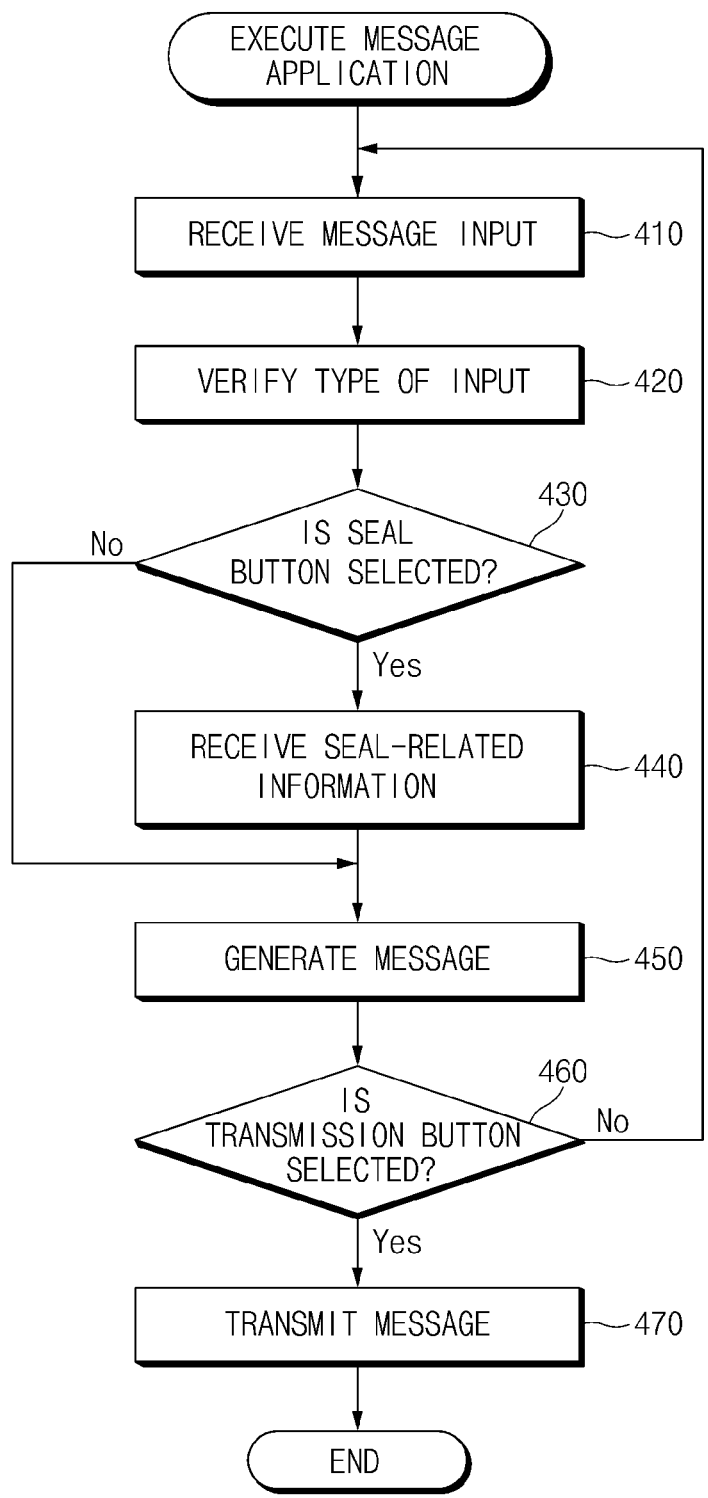
FIG. 4 is a flowchart of a method of operating a transmitting terminal in a system configured for message processing, according to an embodiment of the present disclosure.

FIG. 4 is a flowchart of a method of operating a transmitting terminal in a system configured for message processing, according to an embodiment of the present disclosure.

Referring to FIG. 4, the transmitting terminal 310 shown in FIG. 3 may execute a message application to generate a message. For example, the transmitting terminal 310 may execute the message application when a user input (e.g., message application icon selection) or a specific event (e.g., emergency message reception event) occurs.

In operation 410, the transmitting terminal 310 receives a message input from the user. For instance, the transmitting terminal 310 may receive the user input related to the message generation through the input/output interface 170 shown in FIG. 1.

In operation 420, the transmitting terminal 310 verifies the type of received input. The transmitting terminal 310 may verify whether the received input is the text input, the content selection input, the seal function selection input, or the seal-related information input. In addition, in operation 430, the transmitting terminal 310 determines whether the received input is the seal function selection input (e.g., seal button selection input).

In the case that the seal function selection input is received, the transmitting terminal 310 may set a screen for selecting or inputting the display object to seal the message object and output the screen. In addition, in operation 440, in the case that the display object is selected or inputted, the transmitting terminal 310 may control the output of the screen to receive the seal-related information from the user. For example, the transmitting terminal 310 may set a screen for selecting or inputting the client information, the message confirmation time information, or the receiving terminal designation information in each seal stage and output the screen.

According to various embodiments, in the case that the input is not the seal function selection input, the transmitting terminal 310 may not perform the operation 440. In operation 450, the transmitting terminal 310 may generate a message, which is to be transmitted to the receiving terminal 350 of FIG. 3, using the message object. In the case that the message is the sealed message, the transmitting terminal 310 may generate the message, which is to be transmitted to the receiving terminal, by combining the display object, the message object, and the seal-related information in the operation 450. In this regard, the transmitting terminal 310 may receive identification information (e.g., phone number, network address, identification (ID), etc.) of the receiving terminal from the user. The transmitting terminal 310 may include the received identification information of the receiving terminal in the message.

In operation 460, the transmitting terminal 310 determines whether the message transmission button is selected. In the case that the message transmission button is not selected, the transmitting terminal 310 may receive the message input with respect to the message. In addition, when the seal function selection input is received while the message is generated as the sealed message, the transmitting terminal 310 may designate the content included in the sealed message as the message object and may set and output a screen for selecting or inputting a display object used to seal the newly designated message object. For instance, the transmitting terminal 310 may repeatedly execute the operations 410 to 450, and thus the transmitting terminal may generate a message sealed through at least one seal process.

According to various embodiments, the transmitting terminal 310 may execute the operation that determines whether the message transmission button is selected as the operation 460 not only after the operation 450 is executed but also while the message application is being executed. For example, the transmitting terminal 310 may determine whether the message transmission button is selected or not based on an event management module (e.g., an event listener) with respect to the message transmission button.

In operation 470, the transmitting terminal 310 may transmit the generated message to the receiving terminal. For example, the transmitting terminal 310 may request the transmission of the message to the server 330 of FIG. 3 related to the transmission and reception of the message. According to various embodiments, the transmitting terminal 310 may request the message transmission to the server and receive the response indicating whether the message is transmitted successfully. When the transmitting terminal 310 receives the message transmission failure response from the server, the transmitting terminal 310 may output a notification object (e.g., a notification popup, a notification voice, etc.) to notify the failure of the message transmission. In addition, the transmitting terminal 310 may set and output a message creation screen for regenerating or retransmitting the message. According to various embodiments, the transmitting terminal 310 may directly transmit the message to the receiving terminal without passing through the server based on the identification information of the receiving terminal.

According to various embodiments, operations of generating and transmitting the message may be performed in two ways. For example, as one way, a message circuit manner is used. The transmitting terminal 310 may generate the message in accordance with a pre-specified protocol with the receiving terminal and transmit the generated message to the receiving terminal. The pre-specified protocol may include identifier information corresponding to content, such as an image, an icon, an audio, or a video, included in the message. Accordingly, the transmitting terminal 310 may include the identifiers in the message instead of the content included in the message in accordance with the pre-specified protocol and may transmit the message including the identifiers. In addition, the transmitting terminal 310 may analyze the identifiers included in the message in accordance with the pre-specified protocol and output the content corresponding to the analyzed identifiers.

Alternatively, as another way, a message packet manner is used. The transmitting terminal 310 may include specific information on the method of outputting the content, e.g., text, image, icon, audio, video, etc., in the message and transmit the message including the specific information to the receiving terminal. According to various embodiments, the transmitting terminal 310 may configure the content of the message in a structured text, e.g., a markup language (e.g., html, xml, etc.). Accordingly, the receiving terminal may receive the message in the form of the markup language and analyze the message using a separate decoder to output the content included in the message based on the information on the method of outputting the content. Besides the above-mentioned two methods, the operations of generating and transmitting the message may be performed in various ways not herein described.

Figure 5:
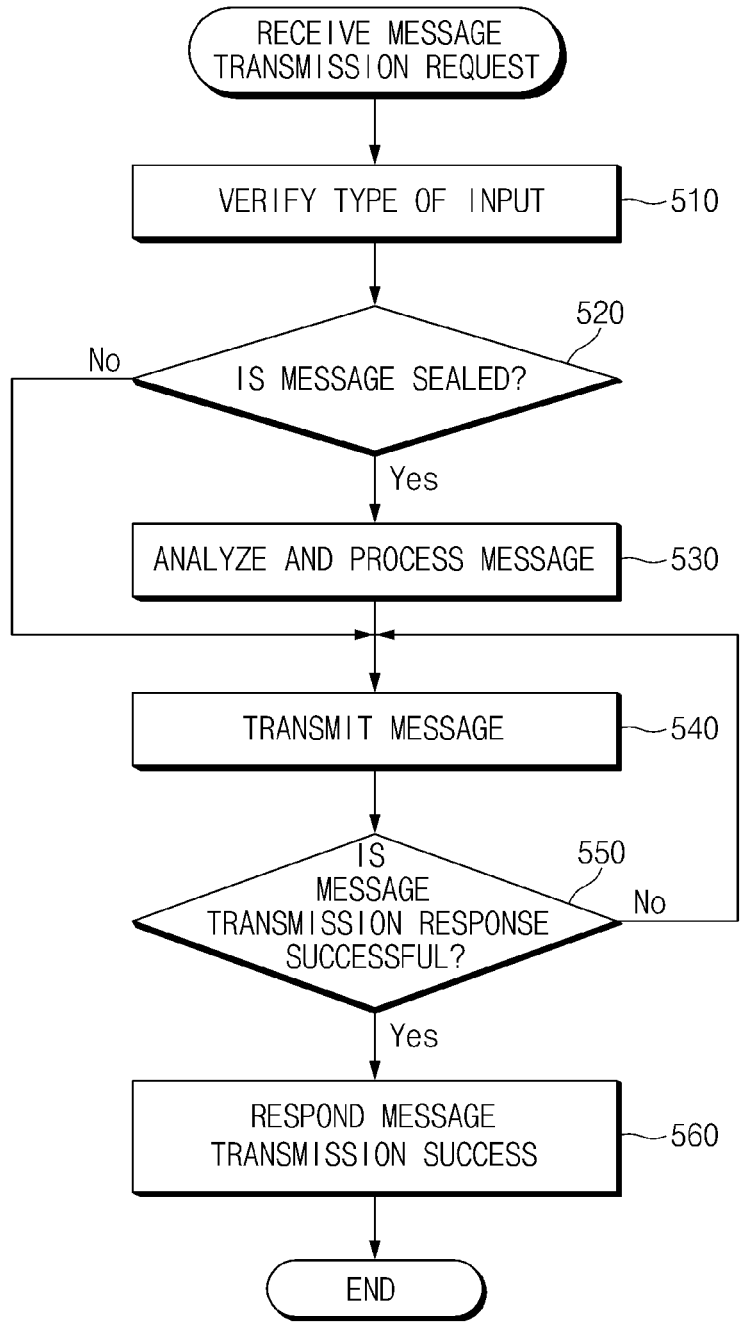
FIG. 5 is a flowchart of a method of operating a server in a system configured for message processing, according to an embodiment of the present disclosure.

FIG. 5 is a flowchart of a method of operating a server in a system configured for message processing, according to an embodiment of the present disclosure.

Referring to FIG. 5, the server 330 of FIG. 3 may receive the request of the message transmission from the transmitting terminal 310 of FIG. 3. In operation 510, the server verifies the type of the message that is to be transmitted to the receiving terminal 350 of FIG. 3). In addition, the server may determine whether the message is the sealed message in operation 520.

In the case that the message is the sealed message, the server 330 may analyze and process the message as in operation 530. For example, the server 330 may confirm the receiving terminal 350 designation information included in the message and determine whether the receiving terminal 350 receiving the message is an electronic device capable of processing the sealed message. In addition, in the case that the receiving terminal 350 is an electronic device that may not process the sealed message, the server 330 may reprocess the message. For example, the server 330 may separate at least one content sealed in each seal stage and included in the message. In addition, the server 330 may reprocess the separated content based on the seal-related information set in each seal stage. The server may generate the content in each seal stage as a new message using the receiving terminal 350 designation information included in the seal-related information set in each seal stage. As another way, the server 330 may set a text of the separated content to a message body and reprocess other content of the separated content as an attached file. According to various embodiments, the server 330 may form each of the separated content as one slide (e.g., each page of the message configured to include a plurality of pages) to generate the message.

In operation 540, the server 330 transmits the message or the reprocessed message to the receiving terminal 350. In the case that the message is not the sealed message, the server may verify the receiving terminal 350 using the receiving terminal 350 designation information included in the message and transmit the message to the receiving terminal 350. In the case that the message is the sealed message, the server 330 may transmit the reprocessed message based on the seal-related information set in each seal stage and included in the message. For example, the server 330 may transmit the reprocessed message to each receiving terminal 350 in accordance with the receiving terminal 350 designation information set in each seal stage.

After the server 330 transmits the message, the server may wait to receive the message transmission response from the receiving terminal 350. When the server 330 receives the message transmission response, the server 330 may verify whether the message is transmitted successfully in operation 550. In the case that the message transmission is failed, the server may perform the operation 540 again. In the case that the message is successfully transmitted, the server 330 may transmit the message transmission success response to the transmitting terminal 350 in operation 560.

Figure 6:
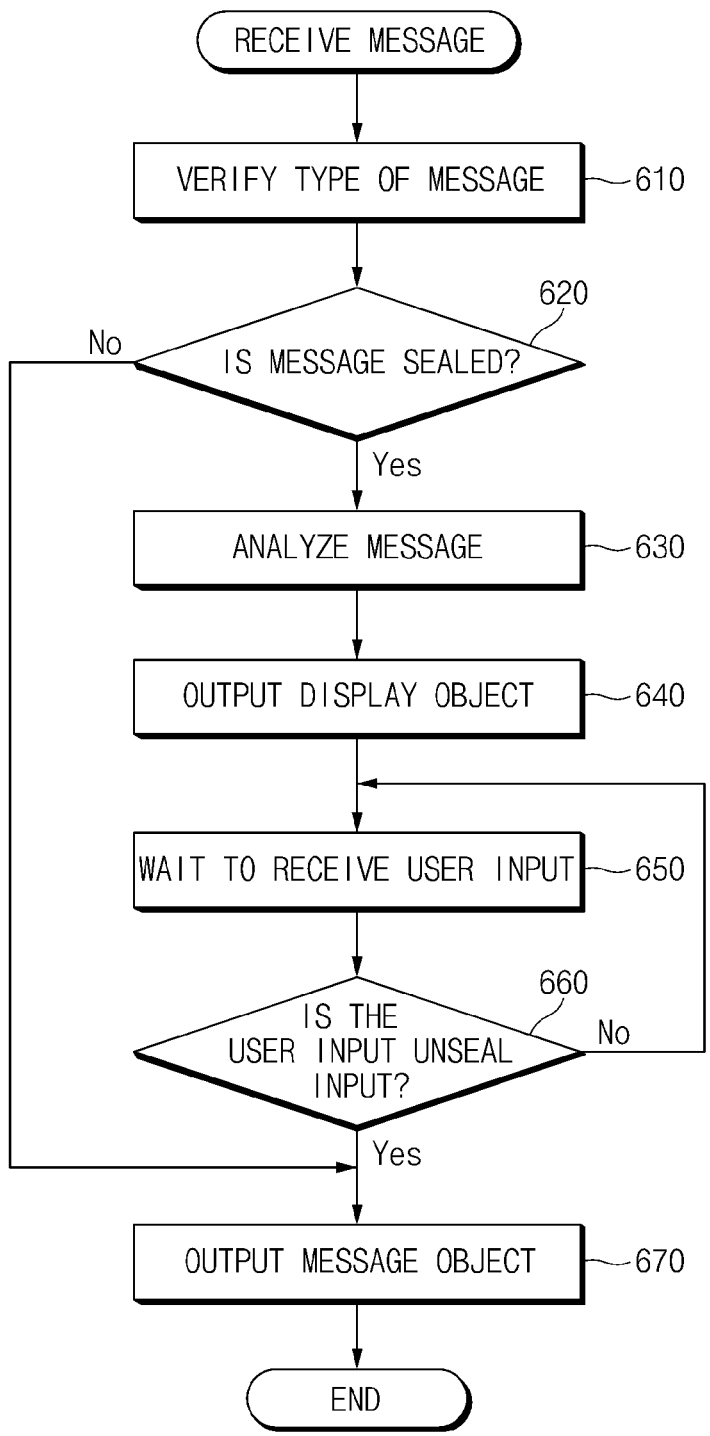
FIG. 6 is a flowchart of a method of operating a receiving terminal in a system configured for message processing, according to an embodiment of the present disclosure.

FIG. 6 is a flowchart of a method of operating a receiving terminal in a system configured for message processing, according to an embodiment of the present disclosure.

Referring to FIG. 6, the receiving terminal 350 of FIG. 3 may receive a message from the server 330 of FIG. 3 or the transmitting terminal 310 of FIG. 3. In operation 610, the receiving terminal 350 may verify the type of the received message. In addition, the receiving terminal 350 may determine whether the message is the sealed message in operation 620.

In the case that the message is not the sealed message, the receiving terminal 350 may output the message object included in the message in operation 670. In this regard, in the case that the message is not the sealed message, the body of the message may include one message object information. In this case, the receiving terminal 350 may output the message object using the message object information included in the body of the message.

In the case that the message is the sealed message, the receiving terminal 350 may analyze the message in operation 630. For example, the receiving terminal 350 may separate at least one content included in the message. In addition, the receiving terminal 350 may analyze the seal-related information set in each seal stage. For example, the receiving terminal 350 may verify the receiving terminal 350 designation information set in each seal stage and determine whether a corresponding content is output.

In operation 640, the receiving terminal 350 may output the display object included in the message. For example, the receiving terminal 350 may output the content, e.g., text, image, icon, audio, video, etc., designated as the display object through an output device. According to various embodiments, the receiving terminal 350 may verify the message confirmation time information included in the seal-related information. In the case that the message confirmation start time or a message confirmation end time is designated, the receiving terminal 350 may output the message confirmation start time or the message confirmation end time through an area adjacent to the display object.

In operation 650, the receiving terminal 350 may wait to receive a user input with respect to the display object. For example, the receiving terminal 350 may wait to receive the user input related to the display object. According to various embodiments, the receiving terminal 350 may receive the user input, such as an input (e.g., a click, a double click, etc.) for selecting the display object or a gesture input (e.g., swipe, sweep, etc.) with respect to the display object, etc.

In operation 660, the receiving terminal 350 determines whether the received user input is the unseal input. In this regard, the receiving terminal 350 may designate the user input corresponding to the unseal input and the seal input of the display object or the message object. In the case that the user input is not the unseal input, the receiving terminal 350 may perform the operation 650 again and may repeatedly perform the operation until the unseal input with respect to the display object is received. According to various embodiments, in the case that the message confirmation start time is designated, even though the unseal input with respect to the display object is input, the receiving terminal 350 may not perform the operation 670 if the message confirmation start time does not come (is not included). In addition, although the unseal input with respect to the display object is not input, the receiving terminal 350 may perform the operation 670 if the message confirmation start time comes (is included).

In the operation 670, in the case that the message is the sealed message, the receiving terminal 350 may output the message object sealed by the display object. According to various embodiments, the receiving terminal 350 may output the message object to the center of the area in which the display object is output after finishing the output of the display object.

Figure 7:
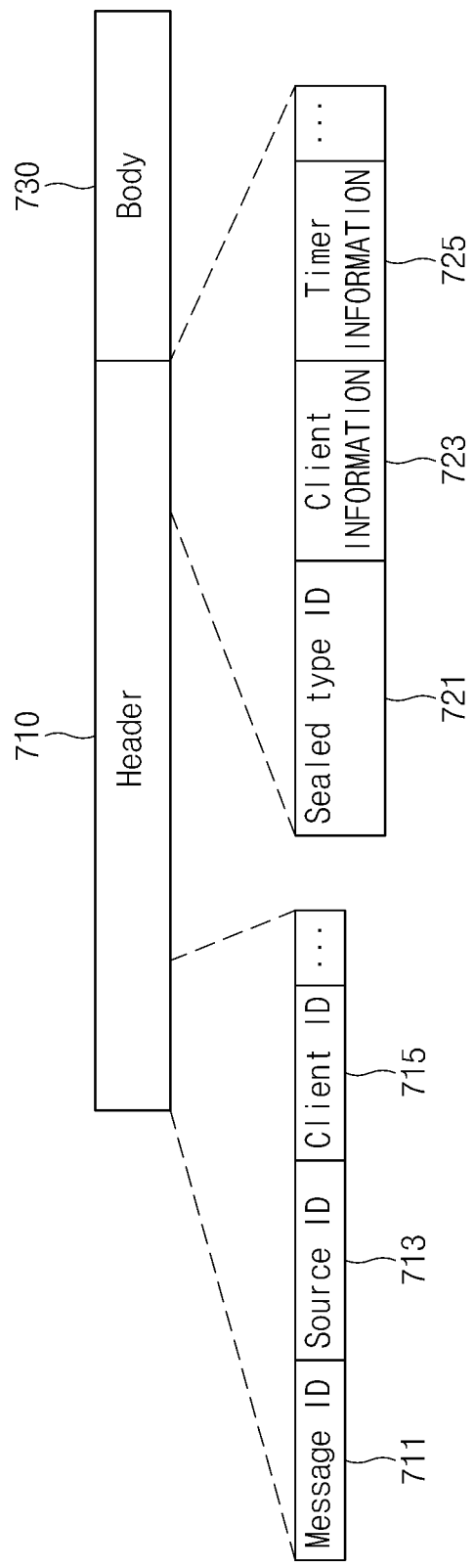
FIG. 7 is a diagram showing a structure of a message, according to an embodiment of the present disclosure.

FIG. 7 is a diagram showing a structure of a message, according to an embodiment of the present disclosure.

Referring to FIG. 7, the message may include a header 710 and a body 730. The header 710 may occupy a certain area of the message and include information required to identify or control the content and type of the message. The header 710 may include a message ID 711 of the message, a source ID 713 of the transmitting terminal, and a client ID 715 of the receiving terminal 350. The message ID 711 may be used to distinguish the message and may include numbers or letters. The source ID 713 of the transmitting terminal 310 may include a phone number, a network address, or an ID of the transmitting terminal 310 as information of the transmitting terminal 310. The client ID 715 of the receiving terminal 350 may include a phone number, a network address, or an ID of the receiving terminal 350 as the receiving terminal 350 designation information.

According to various embodiments, the header 710 may include type information of the message including information indicating whether the message is sealed. In this regard, the transmitting terminal 310 may designate the type information of the message using a telnet service and generate the message to include property information in accordance with the type information of the message. In addition, the header 710 may include the seal-related information. For example, the header 710 may include a sealed type ID 721, a client information 723, and a timer information 725.

The sealed type ID 721 may include the identifier information corresponding to the content included in the message, e.g., image, icon, audio, video, etc. For example, the sealed type ID 721 may include the identifier information of the content sealed in each seal stage.

The client information 723 may include the receiving terminal designation information of the content sealed in each seal stage. In addition, the client information 723 may include information on the electronic devices (e.g., a smart phone, a tablet PC, a wearable device, etc.) owned by a recipient. For example, the client information 723 may include electronic device designation information among the electronic devices, to which a corresponding content is provided.

The timer information 725 may include the message confirmation start time and the message confirmation end time of the content sealed in each seal stage. The message confirmation start time may be a start time at which the message unseal starts. For instance, although the user input with respect to the corresponding display object is the unseal input, the receiving terminal 350 may not output the message object in the case that the message confirmation start time of the message provided to the receiving terminal 350 does not come. In addition, although the unseal input with respect to the display object is not received, the receiving terminal 350 may output the message object in the case that the message confirmation start time comes. The message confirmation end time may be an end time at which the message unseal ends. In detail, when the message confirmation end time of the message provided to the receiving terminal 350 is expired, the receiving terminal 350 may not output the message object even though the user input with respect to the corresponding display object is the unseal input. In addition, when the message confirmation end time of the message object is expired while the message is being output, the receiving terminal 350 may terminate the output of the message object. In this case, the receiving terminal 350 may output the display object set to seal the message object.

In addition to the above-mentioned components, the header 710 may include various information. The header 710 may include seal stage information of the message 710. For instance, the header 710 may include count information indicating that how many times the message is sealed and order information indicating that what number the message is sealed.

The body 730 may include the content of the message, i.e., message object information. In the case that the message is sealed through several seal stages, the body 730 may sequentially include the message object information sealed in each seal stage.

Figure 8A:
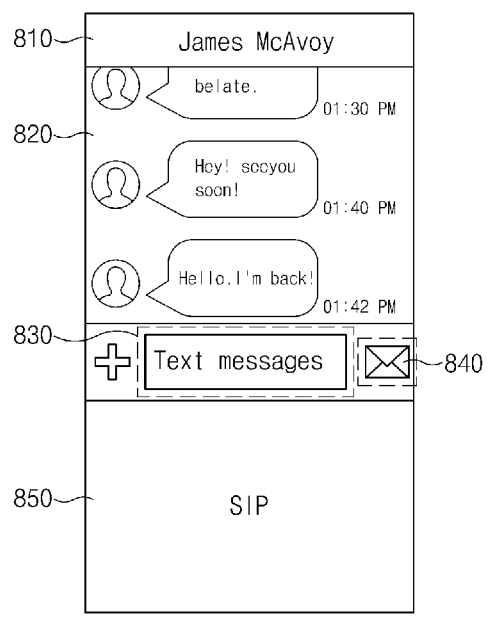
FIG. 8A is a diagram showing a message creation screen, according to an embodiment of the present disclosure.

FIG. 8A is a diagram showing a message creation screen, according to an embodiment of the present disclosure.

Referring to FIG. 8A, the transmitting terminal 310 may output the message creation screen. For example, the transmitting terminal 310 may output recipient information 810, transmission/reception message content 820, message input object 830, or soft input panel 850 to the message creation screen.

The recipient information 810 may include a user name, a phone number, a nickname, an ID, or image of the receiving terminal 350. The recipient information 810 may be output through a predetermined area at an upper end of the message creation screen. In the case that the receiving terminal 350 is provided in a plural number, the transmitting terminal 310 may sequentially output the text or image related to the recipient information 810. In addition, in the case that the output area of the text or image related to the recipient information 810 is not included in the area in which the recipient information 810 are displayed (e.g., a length of the text exceeds the display area), the transmitting terminal 310 may output the information outside the display area by using a predetermined text (e.g., " . . . ").

The transmission/reception message content 820 may correspond to the content of the messages transmitted and received between the transmitting terminal 310 and the receiving terminal 350 and may be output through a predetermined area of the message creation screen, e.g. a predetermined area between an area in which the recipient information 810 are displayed and an area in which the message input object 830 is output. The transmission/reception message content 820 may be the message object information included in the corresponding message, and the transmission/reception message content 820 may be the display object information included in the message in the case that the message is the sealed message. According to various embodiments, the transmission/reception message content 820 may include user image information of the transmitting terminal 310 transmitting the corresponding message or reception time information of the corresponding message.

The message input object 830 may be output through a predetermined area between an area in which the transmission/reception message content 820 are displayed and an area in which the soft input panel 850 is displayed. The message input object 830 may receive the user input related to the message generation. In detail, the message input object 830 may receive a selection input, a text input, or a gesture input related to the seal function. According to various embodiments, the transmitting terminal 310 may output the soft input panel 850 through a predetermined area at a lower end of the message creation screen in response to the selection of the message input object 830. In addition, the transmitting terminal 310 may output the content, such as the text, which are input through the soft input panel 850, through the display area of the message input object 830. According to various embodiments, the transmitting terminal 310 may sequentially output the content sealed in each seal stage to the display area of the message input object 830 as a designated object (e.g., image, icon, etc.) in accordance with the type of the corresponding content. In addition, when the gesture input related to the seal function occurs in the display area of the message input object 830, the transmitting terminal 310 may output a screen for selecting the display object instead of the soft input panel 850. In this case, the transmitting terminal 310 may terminate the output of the message transmission button 840 and output a seal button in the area in which the message transmission button 840 is output.

The message transmission button 840 may serve as a user interface to perform the message transmission function. For example, the transmitting terminal 310 may generate a message transmission event in response to the selection of the message transmission button 840 and transmit the generated message to the receiving terminal 350. The soft input panel 850 may serve as a user interface to input content such as text. For example, the soft input panel 850 may serve as a virtual keyboard that is embodied in software.

Figure 8B:
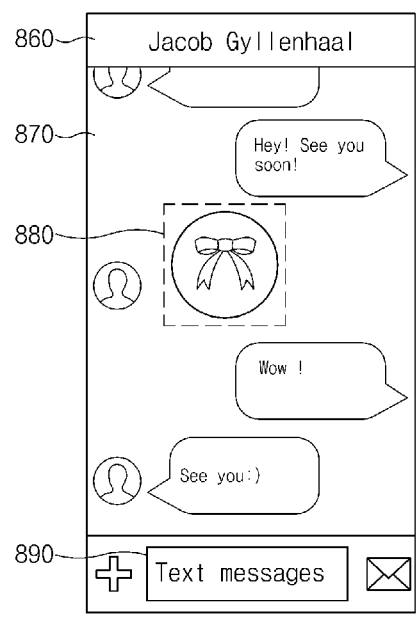
FIG. 8B is a diagram showing a message display screen, according to an embodiment of the present disclosure.

FIG. 8B is a diagram showing a message display screen, according to an embodiment of the present disclosure.

Referring to FIG. 8B, the receiving terminal 350 may output a message display screen. For example, the receiving terminal 350 may provide a message display screen configured to include transmitter information 860, transmission/reception message content 870, and message input object 890. The transmission/reception message content 870 may include the sealed message. For example, when the receiving terminal 350 receives the sealed message, the receiving terminal 350 may output a display object 880 included in the sealed message in an area through which the transmission/reception message content 870 are displayed.

According to various embodiments, the message creation screen output from the transmitting terminal and the message display screen output from the receiving terminal 350 may be the same screen provided by the message application. For example, the message creation screen and the message display screen may be classified by the role of the electronic device (e.g., a transmitting terminal or a receiving terminal) outputting the screen and may have substantially the same configuration. When the user selects the message input object 890 included in the message display screen, the receiving terminal 350 becomes the transmitting terminal 310, and the transmitter information 860 may be the receiver information 810. Accordingly, the message display screen may be referred to as the message creation screen. For example, the message display screen as shown in FIG. 8B may be output as the message creation screen as shown in FIG. 8A in the case that the soft input panel is output through the predetermined area of the lower end portion in response to the selection of the message input object 890.

Figure 9:
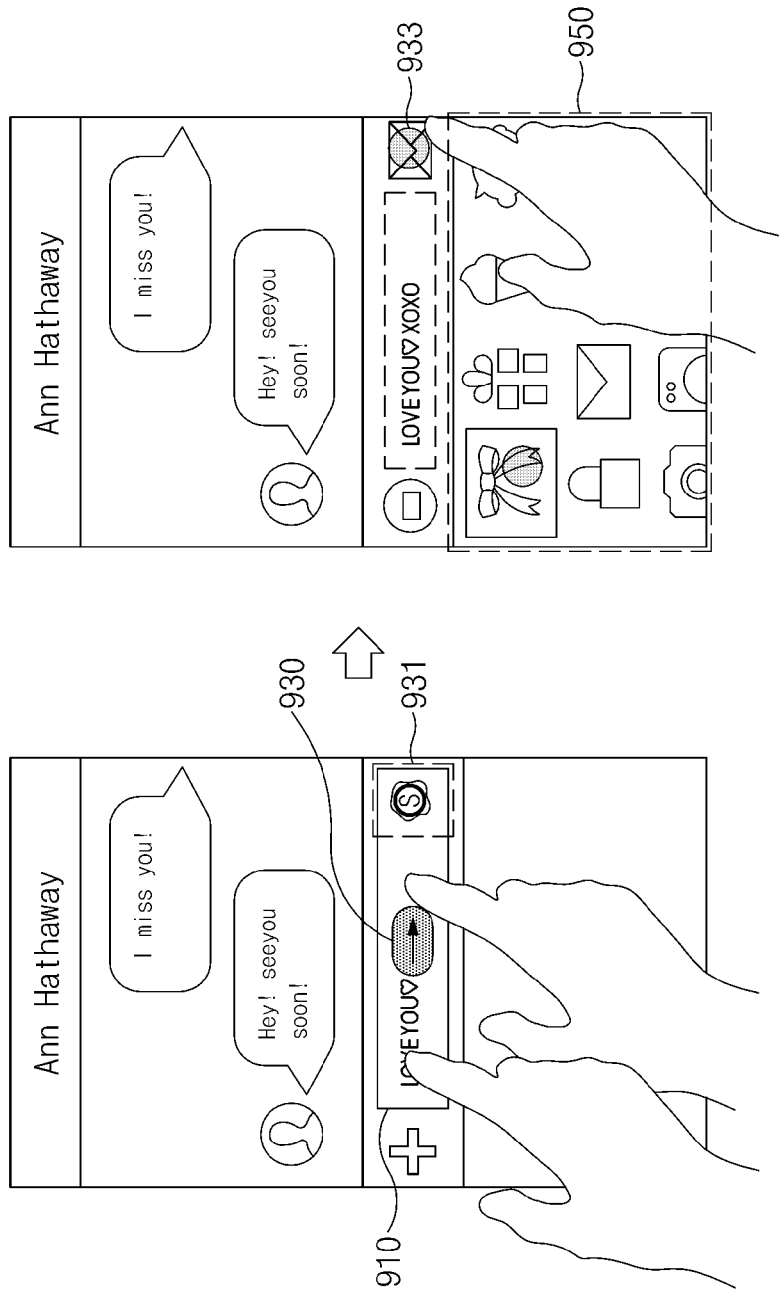
FIG. 9 is a diagram showing a screen related to a message seal, according to an embodiment of the present disclosure.

FIG. 9 is a diagram showing a screen related to a message seal, according to an embodiment of the present disclosure.

Referring to FIG. 9, the transmitting terminal 310 may output a message input object 910 as the message creation screen. In this case, the transmitting terminal 310 may receive an input related to the message generation from the user through the message input object 910. When a gesture input 930 related to the seal function occurs in the display area of the message input object 910, the transmitting terminal 310 may output a screen for selecting a display object. For example, the transmitting terminal 310 may output a display object selection screen 950 in a predetermined area of a lower end portion of the message creation screen. In addition, the transmitting terminal 310 may terminate an output of a message transmission button 933 in response to the gesture input 930 related to the seal function and output a seal button 931 in the area through which the message transmission button 933 is displayed.

According to various embodiments, the gesture input 930 related to the seal function may be differently designated in accordance with the type of the content that is to be selected as the display object. For example, the gesture input 930 related to the seal function may differently designate a touch count, a touch number, or a direction of the gesture input in accordance with the type of the content that is to be selected as the display object. When one finger right swipe input (e.g., an input in which a finger slides to right direction by a predetermined distance while touching the screen) is input to the transmitting terminal 310 as the gesture input 930 related to the seal function, the transmitting terminal 310 may output the display object selection screen 950 such that the icon (e.g., sticker) is selected.

The display object selection screen 950 may be a screen in which the content that may be selected as the display object are arranged in a given way. For example, the display object selection screen 950 may be output in a page (or slide) manner, a thumb nail display manner, or a list manner. In the case that the content, which are to be selected as the display object, are the image or the icon, the transmitting terminal 310 may output the display object selection screen 950 in the thumb nail display manner.

According to various embodiments, in the case that the seal button 931 is selected after the display object is selected, the transmitting terminal 310 may terminate the output of the seal button 931 and output the message transmission button 933. In addition, the transmitting terminal 310 may output the designated object in the display area of the message input object 910 in accordance with the type of the content selected as the display object. For example, in the case that the content is the image or the icon, the transmitting terminal 310 may output a thumb nail image in the display area of the message input object 910. In addition, the transmitting terminal 310 may output the message content generated corresponding to the selection of the message transmission button 933 through the area in which the transmission/reception message content (e.g., the transmission/reception message content 820 of FIG. 8A) is displayed. For example, the transmitting terminal 310 may output the message object included in the generated message with a transmission time through the corresponding area. In addition, in the case that the generated message is the sealed message, the transmitting terminal 310 may output the display object included in the message with the transmission time through the corresponding area.

According to various embodiments, in the case that the seal button 931 is selected after the display object is selected, the transmitting terminal 310 may output a screen for designating lock information related to the unseal. For example, the transmitting terminal 310 may output a pattern input screen, a password input screen, a gesture input screen, or a biometric information recognition screen, which is related to the unseal.

Figure 10A:
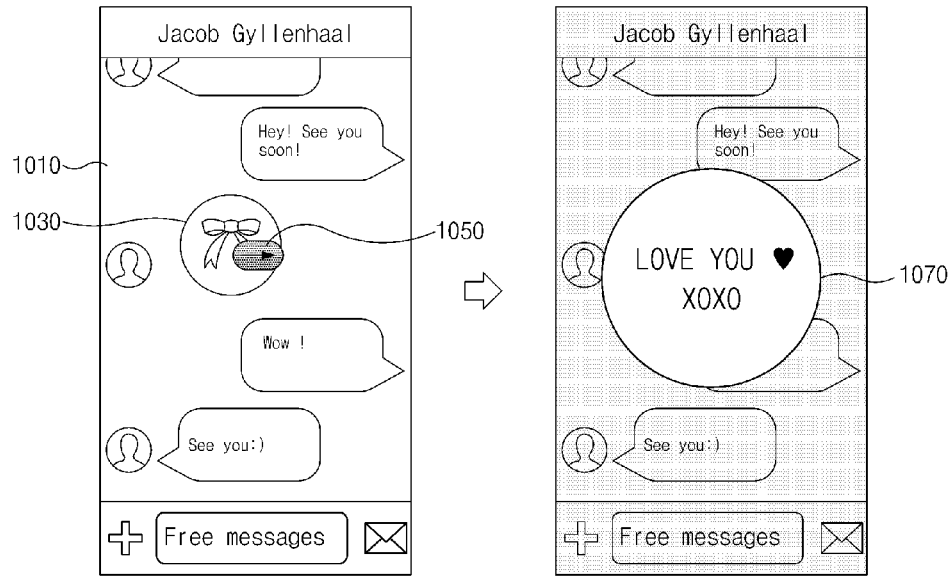
FIG. 10A is a diagram showing a screen related to a message unseal, according to an embodiment of the present disclosure.

FIG. 10A is a diagram showing a screen related to a message unseal, according to an embodiment of the present disclosure.

Referring to FIG. 10A the receiving terminal 350 may output a transmission/reception message content 1010 as a message display screen. The transmission/reception message content 1010 may include message transmission/reception historical information transmitted and received between the transmitting terminal 310 and the receiving terminal 350. For example, the transmission/reception message content 1010 may include not only the message content but also reception time information of a corresponding message. In addition, the transmission/reception message content 1010 may include the user image information of the terminal transmitting the message.

According to various embodiments, the transmission/reception message content 1010 may be message object information included in the message, and the transmission/reception message content 1010 may be display object information included in the message in the case that the message is the sealed message. For example, the receiving terminal 330 may output a display object 1030 included in the sealed message when the sealed message is received.

According to various embodiments, the receiving terminal 350 may receive a user input with respect to the display object 1030. The receiving terminal 350 may receive an unseal input with respect to the display object 1030. In this case, the receiving terminal 350 may control the display object 1030 to output the sealed display object 1070 in response to the unseal input. FIG. 10A shows a screen in which the receiving terminal 350 outputs the message object 1070 after one finger right swipe input 1050 designated as the unseal input with respect to the display object 1030 is received. The receiving terminal 350 may output the message object 1070 as a pop-up object or may configure a new screen and output the message object 1070 in a screen changing method.

According to various embodiments, in the case that the received message is the sealed message sealed through several seal stages, the receiving terminal 350 may output a corresponding message object when a gesture input designated as the unseal input in each seal stage is received. In this case, the receiving terminal 350 may terminate the output of the message object of the seal stage corresponding to a previous order or may output the corresponding message object through the area in which the message object of the seal stage corresponding to the previous order is output.

According to various embodiments, in the case that the lock information related to the unseal is designated when the message object 1070 is sealed, the receiving terminal 350 may not output the message object 1070 even though the unseal input with respect to the display object 1030 is received. In addition, the receiving terminal 350 may display an interface screen such that the user inputs the lock information. In the case that the information input through the interface screen are matched with the lock information about the display object 1030, the receiving terminal 350 may unseal the seal of the message object 1070 to output the message object 1070. In this regard, a method of inputting the lock information, a pattern method of drawing a pattern on the screen, a password method, a gesture input method, or a biometric recognition method (e.g., a fingerprint recognition, an iris recognition, etc.) of inputting biometric information of the user may be used. According to various embodiments, the receiving terminal 350 may receive the lock information from an external electronic device (e.g., a wearable device) connected to the receiving terminal 350 through a communication interface.

Figure 10B:
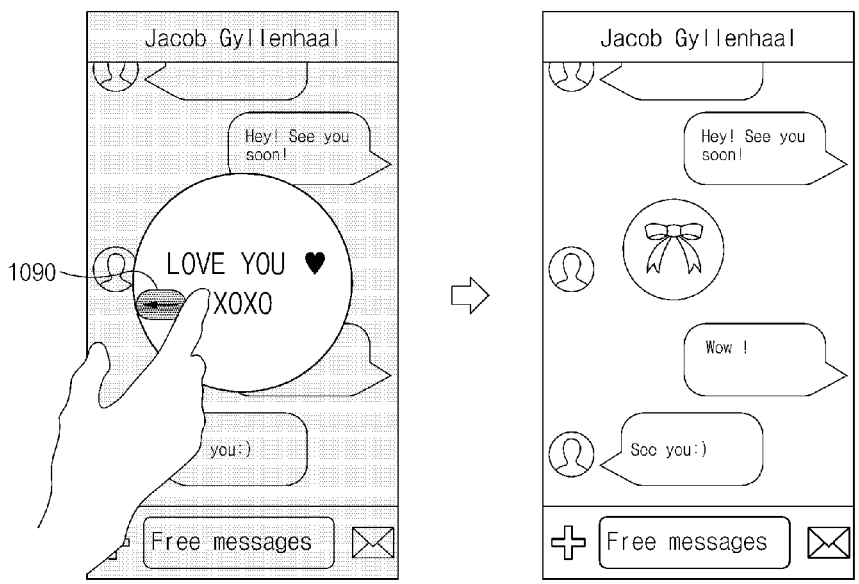
FIG. 10B is a diagram showing a screen related to a message seal, according to an embodiment of the present disclosure.

FIG. 10B is a diagram showing a screen related to a message seal, according to an embodiment of the present disclosure.

Referring to FIG. 10B, the receiving terminal 350 may receive the seal input with respect to the message object 1070 in the state that the message object 1070 is output. In this case, the receiving terminal 350 may terminate the output of the message object 1070 in response to the seal input and output the display object 1030 to seal the message object 1070. FIG. 10B shows a screen in which the receiving terminal 350 terminates the output of the message object 1070 and outputs the display object 1030 after one finger left swipe input 1090 designated as the seal input with respect to the message object 1070 is received. In the case that the message object 1070 is output as the pop-up object, the receiving terminal 350 may terminate the output of the message object 1070 and return to a previous state in which the display object 1030 is output.

According to various embodiments, in the case that the received message is the sealed message sealed through several seal stages, the receiving terminal 350 may output the display object to seal the message object presently displayed when a gesture input designated as the seal input in each seal stage is received. For example, the receiving terminal 350 may output the message object of the seal stage corresponding to the previous order in which the message object is designated as the display object. In the case that the message objects sealed in each seal stage are output in the form of the pop-up, the receiving terminal 350 may terminate the output of the message objects that are presently output and return to a previous state in which the display object (e.g., the message object of the previous seal stage) sealing the message object presently output is output.

Figure 11A:
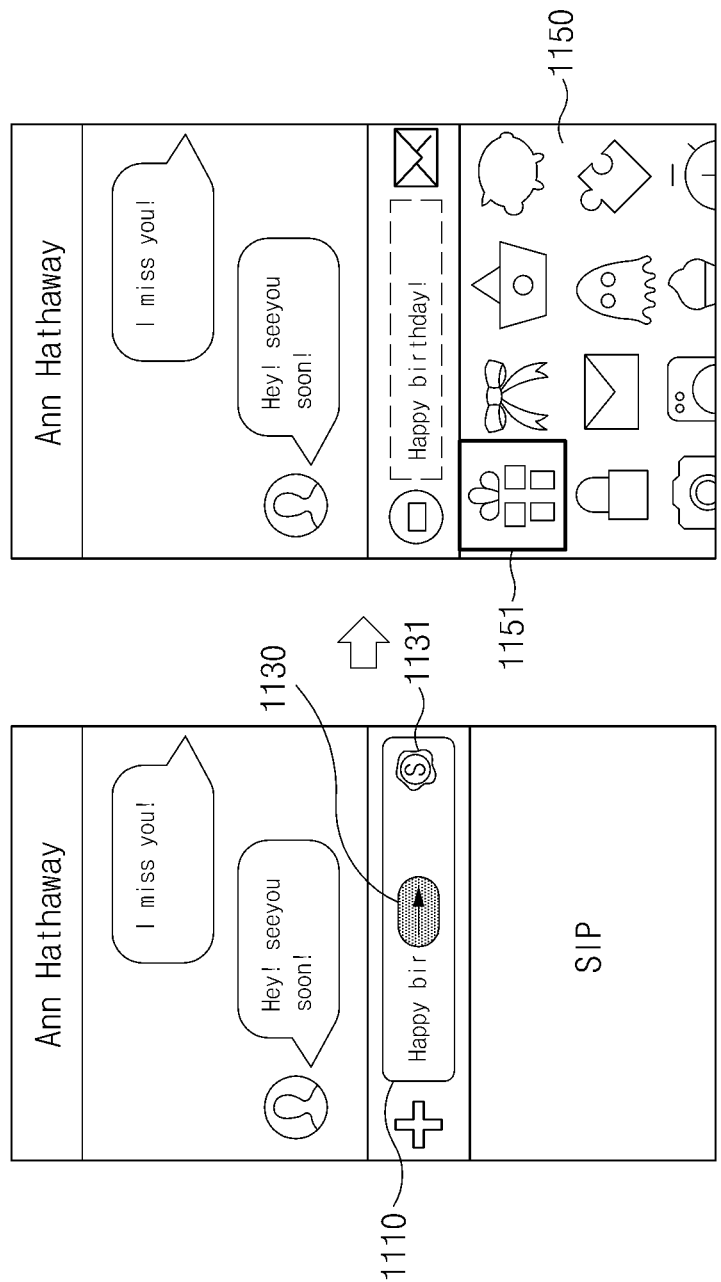
FIG. 11A is a diagram showing a screen recommending a display object based on content of a message object, according to an embodiment of the present disclosure.

FIG. 11A is a diagram showing a screen recommending a display object based on content of a message object, according to an embodiment of the present disclosure. The transmitting terminal 310 may recommend the display object based on the type of the message object, the content of the message object, the use historical information of a seal function, or context information of the user when the message object is sealed with the display object.

Referring to FIG. 11A, when a gesture input 1130 designated as the seal input is received in the message input object 1110, the transmitting terminal 310 may replace the message transmission button with a seal button 1131 and output a display object selection screen 1150 in the area through which the soft input panel is output. In addition, the transmitting terminal 310 may output display objects after changing a configuration of the display objects based on the content of the message object when the display object selection screen 1150 is output. For instance, when the content of the message object includes a text related to birthday such as happy birthday, the transmitting terminal 310 may output recommendable content 1151 (e.g., a happy birthday text, a birthday cake image, a birthday present icon, a happy birthday song, a video taken on the birthday, etc.) in the display object selection screen 1150 prior to other content. The transmitting terminal 310 may output the recommendable content 1151 at a high order of the slide in the case that the display manner of the display object selection screen 1150 is the sliding manner, output the recommendable content 1151 at the high order position in the case that the display manner of the display object selection screen 1150 is the thumb nail manner, and output the recommendable content 1151 at an upper end of list in the case that the display manner of the display object selection screen 1150 is the list manner. The transmitting terminal 310 may output the recommendable content 1151 after changing a color, background color, thickness, shape of boundary, or transparency of the content 1151. In this regard, the transmitting terminal 310 may analyze content of the message object to understand a context and may store a designated word or property information (e.g., a filename), which is used to understand the context, into a memory (e.g., the memory 150 of FIG. 1).

Figure 11B:
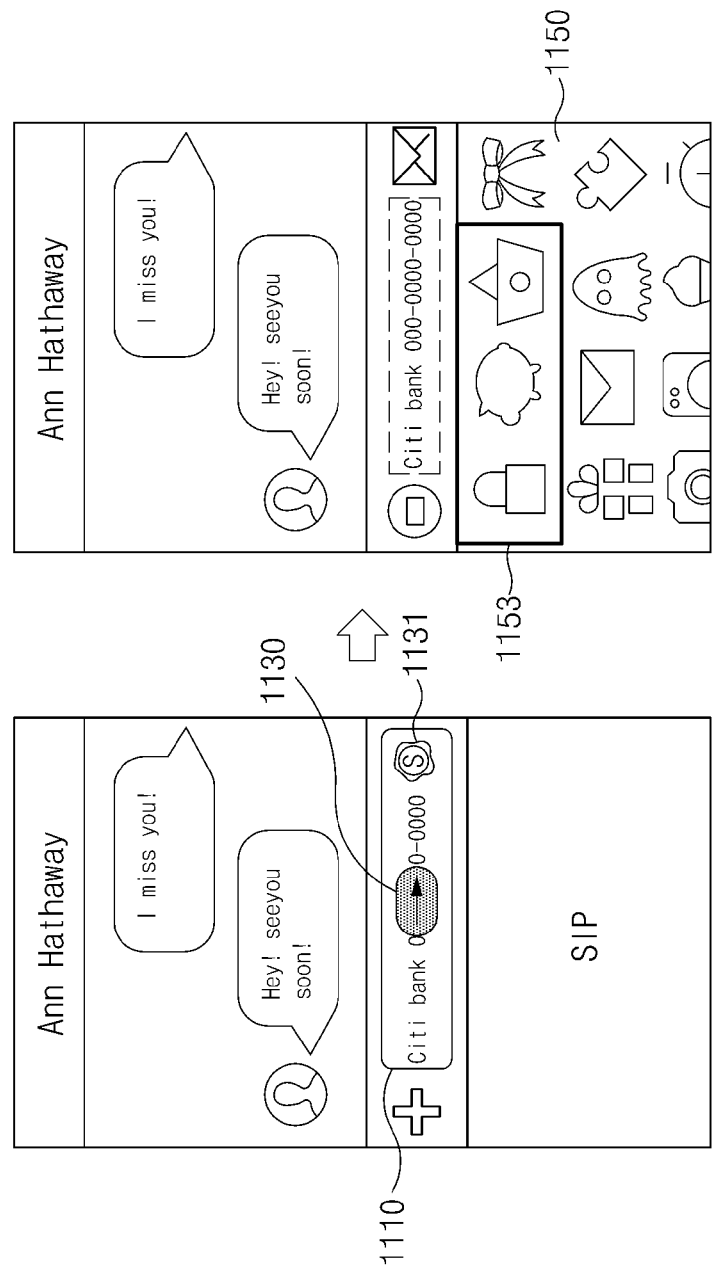
FIG. 11B is a diagram showing a screen recommending a display object corresponding to a message object based on historical information of a seal function, according to an embodiment of the present disclosure.

FIG. 11B is a diagram showing a screen recommending a display object corresponding to a message object based on historical information of a seal function, according to an embodiment of the present disclosure.

Referring to FIG. 11B, the transmitting terminal 310 may utilize the use historical information of the seal function when the transmitting terminal 310 outputs the display object selection screen 1150. The transmitting terminal 310 may determine whether the message object has been previously sealed. In the case that the message object is the text including account information such as "Citi bank 000-0000-0000" and historical information in which the message object is sealed with the display object designated as a lock icon exists, the transmitting terminal 310 may preferentially place a corresponding display object and a display object 1153 having types, content, or properties similar to those of the corresponding display object on the display object selection screen 1150. FIG. 11B shows the lock icon having the seal history for the text including the account information and icons having types, content, or properties similar to those of the lock icon, which are placed at the high order position of the display object selection screen 1150 by the transmitting terminal 310.

According to various embodiments, the transmitting terminal 310 may recommend the display object based on not only the content of the message object and the use historical information of the seal function but also the type of the message object or the context information of the user. In the case that the type of the message object is voice information, the transmitting terminal 310 may recommend related content, such as a microphone image, a recorder icon, etc., as the display object. In addition, the transmitting terminal 310 may recommend different display objects in accordance with the context information of the user, e.g., position information at which the user transmits the message. For example, in the case that the user transmits the message at a bank, the transmitting terminal 310 may recommend the lock icon or a bankbook image as the display object sealing the message object and preferentially output the display object on the display object selection screen 1150.

According to various embodiments, in the case that the display object is designated as an icon related to security, e.g., the lock icon, the transmitting terminal 310 may output a screen for designating the lock information in association with the unseal of the display object. The transmitting terminal 310 may designate predetermined lock information as the lock information related to an unseal of the corresponding display object in accordance with a type of icons related to the security.

Figure 12A:
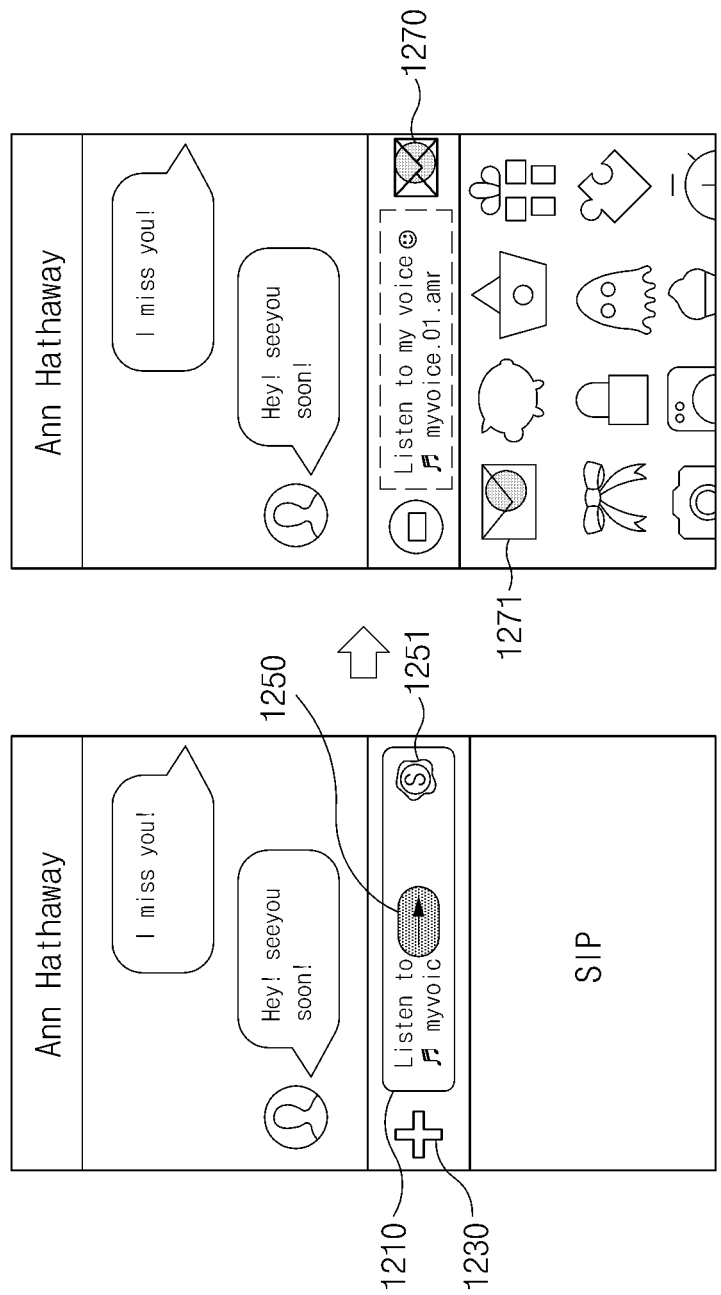
FIG. 12A is a diagram showing a screen related to a seal of a message object including audio, according to an embodiment of the present disclosure.

FIG. 12A is a diagram showing a screen related to a seal of a message object including audio, according to an embodiment of the present disclosure.

Referring to FIG. 12A, the transmitting terminal 310 may include a variety of content as the message object. FIG. 12A shows a screen of the transmitting terminal 310 including a text and an audio as the message object. The transmitting terminal 310 may output a screen for selecting various content stored in the memory 150 of FIG. 1 in response to a selection through a content add button 1230. For instance, the transmitting terminal 310 may output the screen for selecting the content, such as an image, an icon, an audio, a video, etc., stored in the memory 150.

According to various embodiments, when a specific content is selected in the screen for selecting the content, the transmitting terminal 310 may sequentially display a previously input content and the added content in a display area of the message input object 1210. In this case, the transmitting terminal 310 may display property information (e.g., a filename) of the content in the case that the corresponding content is not a text. As another example, if the corresponding content is the image or the icon, the transmitting terminal 310 may display a thumb nail image.

According to various embodiments, the transmitting terminal 310 may select various kinds of content as the display object similar to the message object. When a gesture input 1250 designated as a seal input with respect to the message input object 1210 is received, the transmitting terminal 310 may replace a message transmission button 1270 with a seal button 1251 and output a display object selection screen (e.g., the display object selection screen 950 of FIG. 9). In addition, the transmitting terminal 310 may seal the message object in response to a selection of a specific display object 1271. In this case, the display object 1271 may include text, icon, audio, or video. The display object 1271 may be constituted by a combination of pieces of content. For example, the display object 1271 may be constituted by a combination of a specific icon and a specific audio. As another example, the display object 1271 may be provided in a form obtained by combining the specific audio and the specific icon.

Figure 12B:
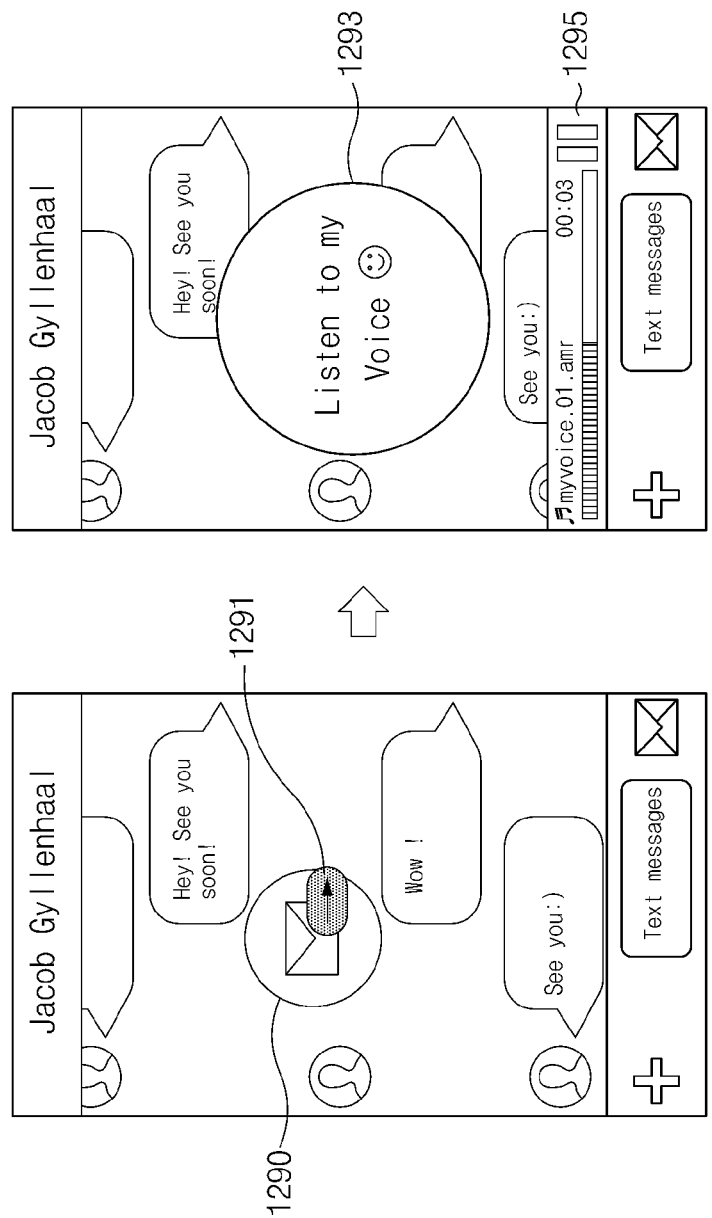
FIG. 12B is a diagram showing a screen related to output of a message object including audio, according to an embodiment of the present disclosure.

FIG. 12B is a diagram showing a screen related to output of a message object including audio, according to an embodiment of the present disclosure.

Referring to FIG. 12B, the receiving terminal 350 may receive a message in response to the selection of the message transmission button 1270 and output a message display screen for verifying the received message. For example, the receiving terminal 350 may output a display object 1290 included in a sealed message through an area in which the transmission/reception message content (e.g., the transmission/reception message content 870 of FIG. 8B) is displayed. In addition, when a gesture input 1291 designated as the unseal input with respect to the display object 1290 is received, the receiving terminal 350 may output the message object included in the sealed message. In the case that the message object includes various kinds of content, the receiving terminal 350 may separate the content from each other and output the separated content through an output device. As shown in FIG. 12B, in the case that the message object includes the text and the audio, the receiving terminal 350 may separate the text from the audio. In addition, the receiving terminal 350 may output the separated text through a display as a popup object 1293 and output the separated audio through a voice output device. In this case, the receiving terminal 350 may output an object showing a reproducing state of the audio in association with the output of the audio through the display.

According to various embodiments, in the case that a sound is output while playing the audio or the video, the receiving terminal 350 may omit the output of the corresponding content or designate a voice output path in accordance with a connection state of a voice output device or set information in association with a voice volume.

Figure 13A:
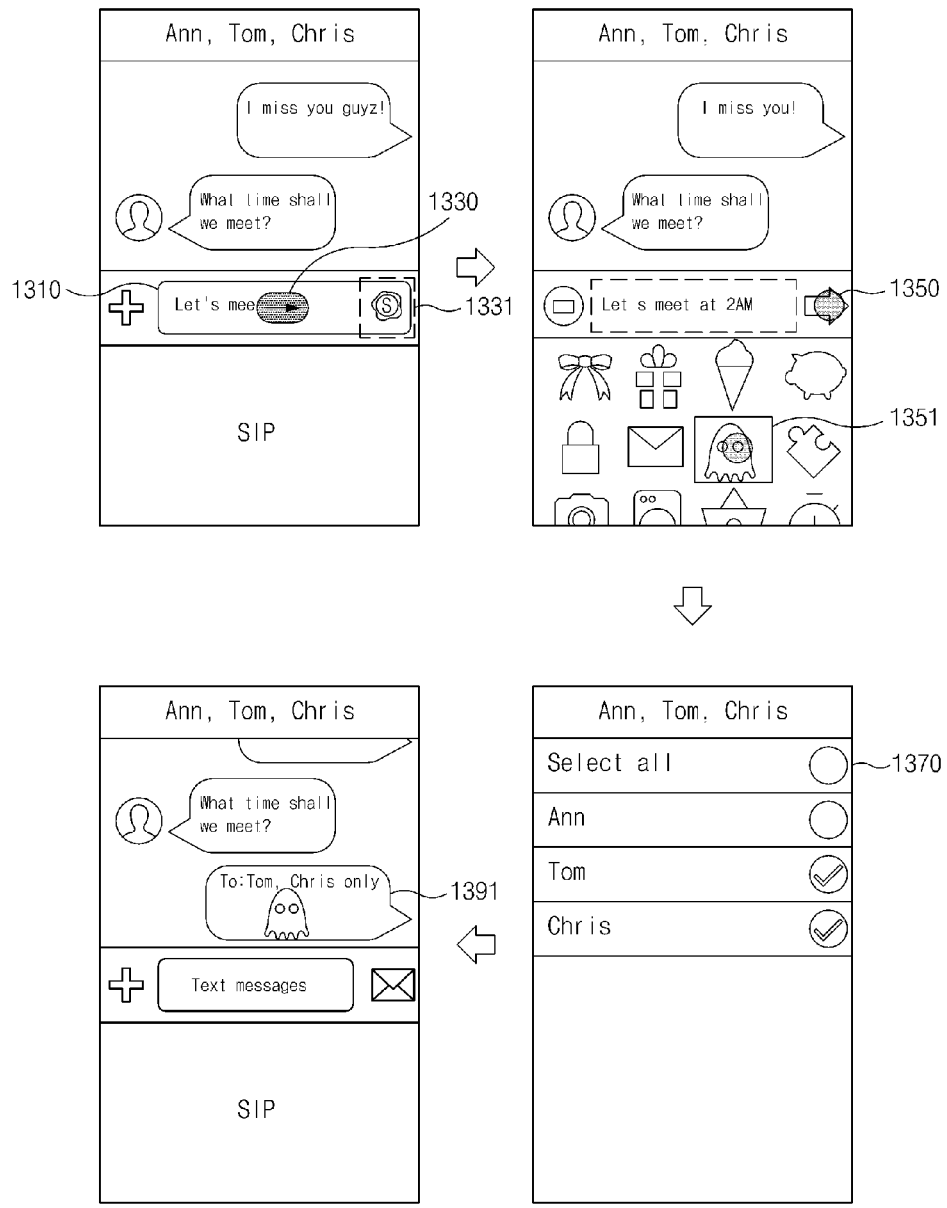
FIG. 13A is a diagram showing a screen related to designation of a receiving terminal of a message, according to an embodiment of the present disclosure.

FIG. 13A is a diagram showing a screen related to designation of a receiving terminal of a message, according to an embodiment of the present disclosure.

Referring to FIG. 13A, the transmitting terminal 310 of FIG. 3 may output a screen for designating the receiving terminal 350 that may verify a message object when the message object is sealed. For example, when a gesture input 1330 designated as a seal input with respect to a message input object 1310 is received, the transmitting terminal 310 may replace a message transmission button with a seal button 1331 and output a display object selection screen (e.g., the display object selection screen 950 of FIG. 9). In addition, the transmitting terminal 310 may replace the seal button 1331 with a receiving terminal 350 designation button 1350 in response to a selection of a specific display object 1351. When the receiving terminal 350 designation button 1350 is selected, the transmitting terminal 310 may output a receiving terminal designation screen 1370 to select the receiving terminal 350.

According to various embodiments, the receiving terminal designation screen 1370 may be configured based on contact information of an external electronic device, friend information related to a message application, or chat counterpart information, which are stored in the transmitting terminal 310. In addition, the receiving terminal designation screen 1370 may include identification information (e.g., a user name) of the receiving terminal 350 and a selection button, and the receiving terminal designation screen 1370 may be output in a pop-up method or in a screen changing method. FIG. 13A shows a case that multiple receiving terminals 350 are selected. In addition, the receiving terminal designation screen 1370 may be output in response to the selection of the receiving terminal designation button 1350 in each seal stage such that the receiving terminal 350 of the message object sealed in each seal stage is designated.

According to various embodiments, the transmitting terminal 310 may control to allow the seal button 1331 to perform a function of the receiving terminal designation button 1350 instead of replacing the seal button 1331 with the receiving terminal designation button 1350 in response to the selection of the display object 1351. Alternatively, the transmitting terminal 310 may output the receiving terminal designation screen 1370 in response to the selection of the display object 1351. When the receiving terminal 350 is designated and the message transmission button is selected, the transmitting terminal 310 may output a display object included in the transmitted message and an object 1391 including receiving terminal designation information in the area through which the transmission/reception message content (e.g., the transmission/reception message content 820 of FIG. 8A) is displayed. In the case that the transmitted message is a message sealed through several seal stages, the transmitting terminal 310 may output a first display object sealing the first message object and an object including the receiving terminal designation information of the first message object.

Figure 13B:
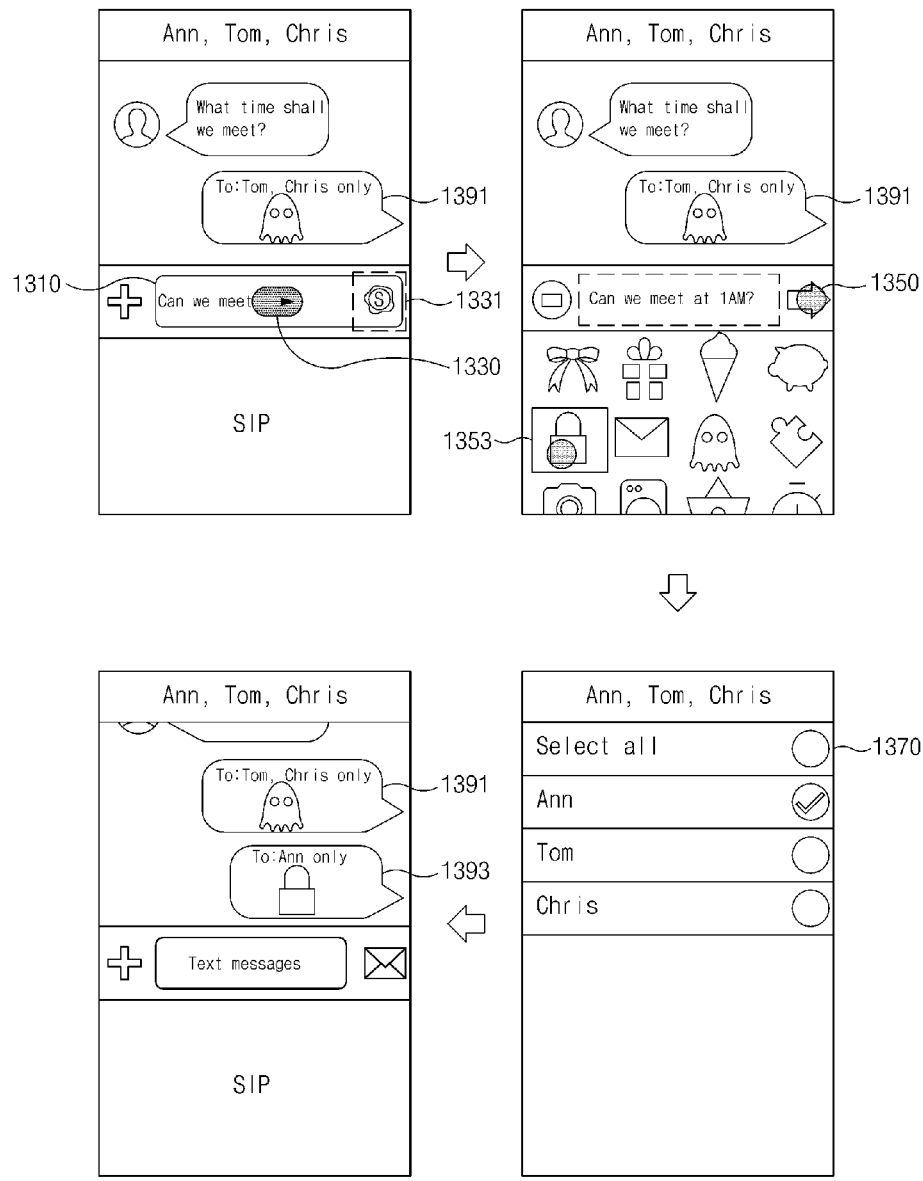
FIG. 13B is a diagram showing another example of a screen related to designation of a receiving terminal of a message, according to an embodiment of the present disclosure.

FIG. 13B is a diagram showing another example of a screen related to designation of a receiving terminal of a message, according to an embodiment of the present disclosure.

Referring to FIG. 13B, the transmitting terminal 310 may generate another sealed message through a process that is similar to or same as the sealed message of FIG. 13A. For example, the transmitting terminal 310 may select a display object 1353 sealing a message object and designate a receiving terminal through a receiving terminal designation screen 1370 output corresponding to the receiving terminal designation button 1350. Through the above-mentioned process, the transmitting terminal 310 may output not only a display object included in a previously transmitted message and an object 1391 including the receiving terminal designation information, but also a display object included in a newly transmitted message and an object 1393 including the receiving terminal designation information.

According to various embodiments, the sealed message, in which the receiving terminal 350 is designated when the message object is sealed, may be processed in different ways in accordance with whether the receiving terminal 350 may process the sealed message. For example, in the case that the receiving terminal 350 is an electronic device that may not process the sealed message, the server 330 may separate the display object from the message object and transmit the message to the receiving terminal 350 after reprocessing the message. In addition, when a sealed message designated to be transmitted to a plurality of receiving terminals 350 is transmitted, the server 330 may process the sealed message designated to be transmitted to the receiving terminals 350 in different ways in accordance with whether the receiving terminals 350 may process the sealed message. For example, the server 330 may transmit the sealed message to the receiving terminals 350 that may process the sealed message without performing additional process and transmit the sealed message to the receiving terminals 350 that may not process the sealed message after reprocessing the sealed message.

Figure 14A:
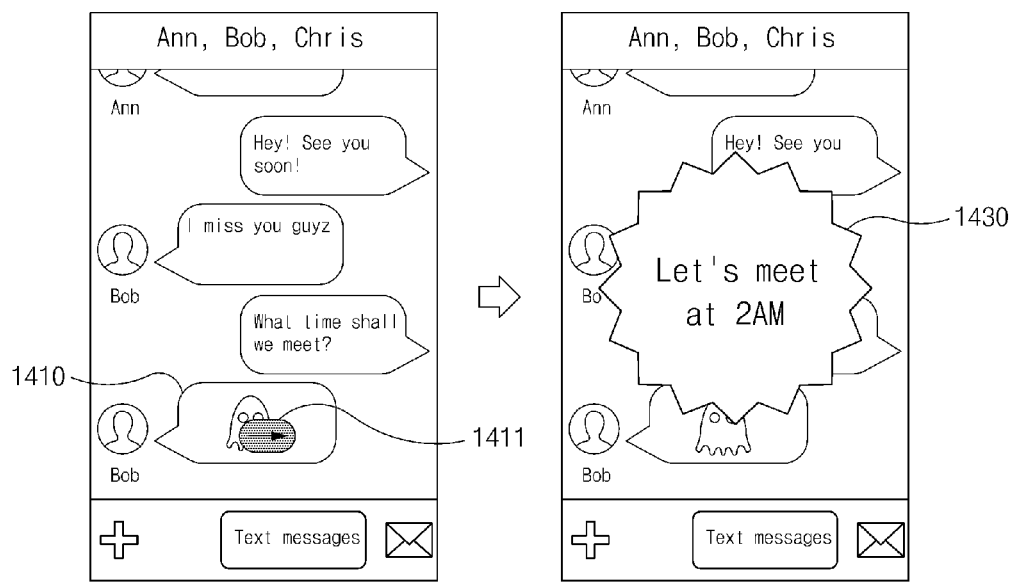
FIG. 14A is a diagram showing a screen related to confirmation of a designated message using a receiving terminal, according to an embodiment of the present disclosure.

FIG. 14A is a diagram showing a screen related to confirmation of a designated message using a receiving terminal, according to an embodiment of the present disclosure.

Referring to FIG. 14A, the receiving terminal 350 may output a display object 1410 of a sealed message when the receiving terminal 350 receives the sealed message. In addition, the receiving terminal 350 may output a message object 1430 sealed with a display object 1410 when a gesture input 1411 designated as an unseal input is received.

According to various embodiments, receiving terminal designation information of the sealed message may be set different from receiving terminal designation information of seal content sealed in each seal stage. For example, at least one receiving terminal included in the receiving terminal designation information of the sealed message may not be included in the receiving terminal designation information of the seal content sealed in each seal stage. In this case, the server 330 may transmit the sealed message to corresponding receiving terminals 350 based on the receiving terminal designation information of the sealed message. Accordingly, when the gesture input 1411 designated as the unseal input with respect to the sealed message is received, the receiving terminal 350 may verify the receiving terminal designation information of the seal content sealed in each seal stage and differently process the sealed message in accordance with whether the receiving terminal 350 may unseal the sealed message.

According to various embodiments, the server 330 may transmit a sealed message obtained by separately reforming content, which are designated to the receiving terminal 350 using corresponding receiving terminals 350, to each corresponding receiving terminal 350 based on the receiving terminal designation information of the seal content sealed in each seal stage. In this case, since the receiving terminal 350 is designated as the electronic device that may verify the received sealed message, the receiving terminal 350 may output the message object 1430 when the gesture input 1411 designated as the unseal input is received.

Figure 14B:
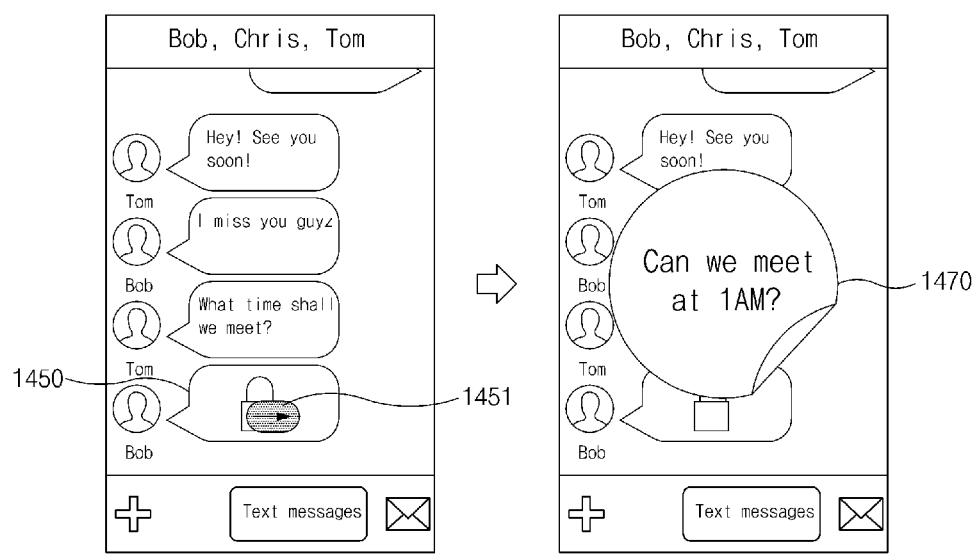
FIG. 14B is a diagram showing another example of a screen related to confirmation of a designated message using a receiving terminal, according to an embodiment of the present disclosure.

FIG. 14B is a diagram showing another example of a screen related to confirmation of a designated message using a receiving terminal, according to an embodiment of the present disclosure.

Referring to FIG. 14B, the receiving terminal 350 may confirm another sealed message through a process that is similar to or the same as the sealed message confirmation of FIG. 14A. For example, the receiving terminal 350 may output a message object 1470 when a gesture input 1441 designated as an unseal input with respect to a display object 1450 is received.

FIGS. 13A, 13B, 14A, and 14B show screens in association with transmission/reception of a group chat or message. For example, FIGS. 13A and 13B show the screen in which a first user (e.g., a user named "Bob") transmits the sealed message to a second user (e.g., a user named "Tom"), a third user (e.g., a user named "Chris"), and a fourth user (e.g., a user named "Ann"). In addition, FIG. 14A shows the screen in which the second user confirms the received sealed message, and FIG. 14B shows the screen in which the fourth user confirms the received sealed message.

As shown in FIG. 13A, the first user may designate the second and third users as the receiving terminals 350 when the message object is sealed and transmit a first sealed message to the second and third users. In addition, as shown in FIG. 13B, the first user may designate the fourth user as the receiving terminal 350 when the message object is sealed and transmit a second sealed message to the fourth user. In this case, the first sealed message may include information on the second, third, and fourth users in the receiving terminal designation information, but the receiving terminal designation information in each seal stage may include only the information on the second and third users. In addition, the second sealed message may include the information on the second, third, and fourth users in the receiving terminal designation information, but the receiving terminal designation information in each seal stage may include only the information on the fourth user.

According to various embodiments, the server 330 may transmit the first and second sealed messages to the second, third, and fourth users, or the server 330 may transmit the first sealed message only to the second and third users and the second sealed message only to the fourth user. Although the first and second sealed messages are transmitted to all of the second, third, and fourth users, the fourth user may not unseal the first sealed message, and the second and third users may not unseal the second sealed message. FIGS. 14A and 14B show screens in which the sealed message is transmitted to the corresponding receiving terminal 350 based on the receiving terminal designation information in each seal stage. As shown in FIG. 14A, the second user may receive only the first sealed message. In addition, as shown in FIG. 14B, the fourth user may receive only the second sealed message.

Figure 15:
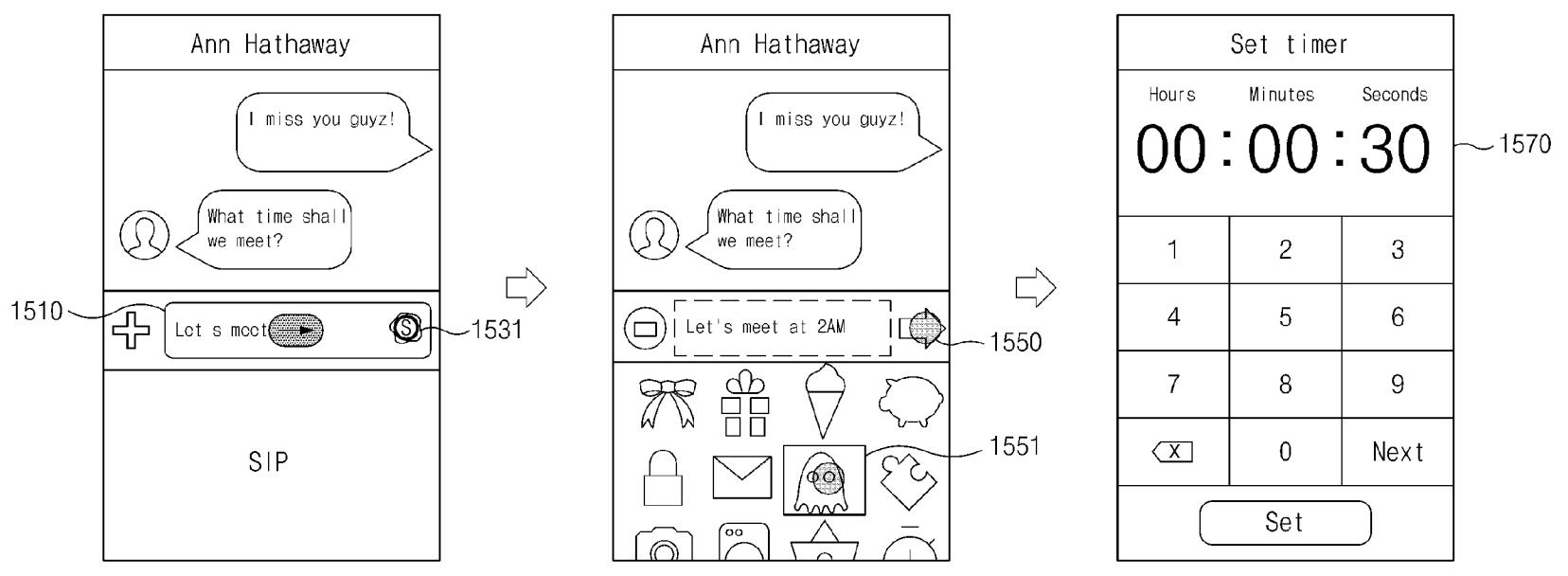

FIG. 15 is a diagram showing a screen related to designation of a time to confirm a message, according to an embodiment of the present disclosure.

Referring to FIG. 15, the transmitting terminal 310 may designate a message confirmation time when the message object is sealed. For example, when a gesture input designated as a seal input with respect to a message input object 1510 is received, the transmitting terminal 310 may replace a message transmission button with a seal button 1531 and output a display object selection screen (e.g., the display object selection screen 950 of FIG. 9). In addition, the transmitting terminal 310 may replace the seal button 1531 with a confirmation time designation button 1550 in response to the selection of the display object 1551. The transmitting terminal 310 may output a confirmation time designation screen 1570 in response to a selection through the confirmation time designation button 1550.

According to various embodiments, the confirmation time designation screen 1570 may include set time information and a button or input object setting a time. The confirmation time designation screen 1570 may be output in a pop-up method or in a screen changing method. In addition, the confirmation time designation screen 1570 may be output in response to the selection of the confirmation time designation button 1550 in each seal stage such that the confirmation time with respect to the message object may be designated in each seal stage.

According to various embodiments, the transmitting terminal 310 may control to allow the seal button 1531 to perform a function of the confirmation time designation button 1550 instead of replacing the seal button 1531 with the confirmation time designation button 1550 in response to the selection of the display object 1551. Alternatively, the transmitting terminal 310 may output the confirmation time designation screen 1570 in response to the selection of the display object 1551. When the confirmation time of the message is designated and the message transmission button is selected, the transmitting terminal 310 may output a display object included in the transmitted message and an object including the confirmation time designation information of the message in the area through which the transmission/reception message content (e.g., the transmission/reception message content 820 of FIG. 8A) is displayed. In the case that the transmitted message is a message sealed through several seal stages, the transmitting terminal 310 may output a first display object sealing the first message object and an object including the confirmation time designation information of the first message object.

Figure 16:
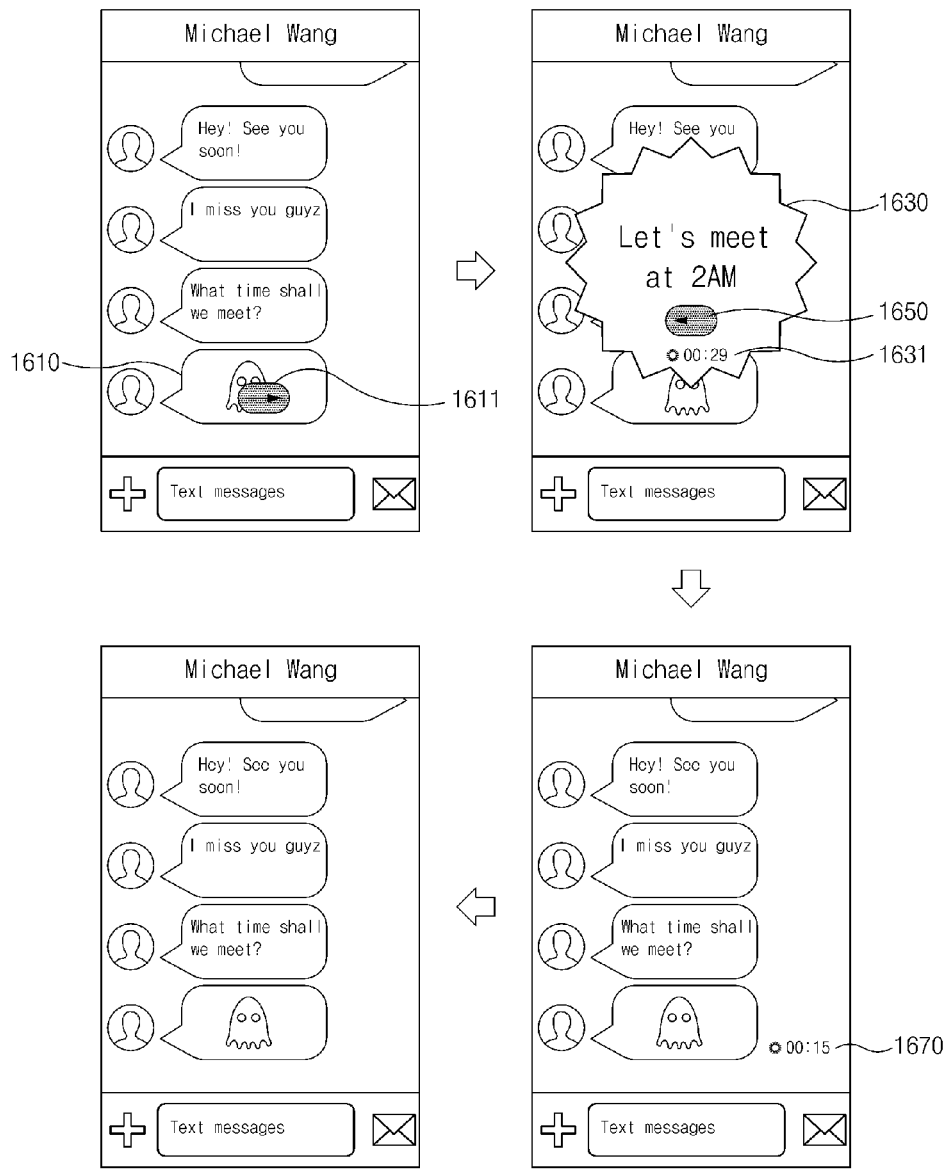
FIG. 16 is a diagram showing a screen related to confirmation of the message with which the confirmation time is designated, according to an embodiment of the present disclosure.

FIG. 16 is a diagram showing a screen related to confirmation of the message with which the confirmation time is designated, according to an embodiment of the present disclosure.

Referring to FIG. 16, the receiving terminal 350 may confirm a sealed message in which a confirmation time of the message is designated. For example, the receiving terminal 350 may output a display object 1610 included in the transmitted message in the area through which the transmission/reception message content (e.g., the transmission/reception message content 870 of FIG. 8B) is displayed. In the case that the message confirmation start time is designated in the received message, the receiving terminal 350 may output the message confirmation start time at a position adjacent to the display object 1610. In addition, when a gesture input 1611 designated as an unseal input with respect to the display object 1610 is received, the receiving terminal 350 may output a sealed message object 1630 as the display object 1610. In the case that a message confirmation end time 1631 is designated in the received message, the receiving terminal 350 may output the message confirmation end time 1631 with the message object 1630.

According to various embodiments, when a gesture input 1650 designated as a seal input with respect to the message object 1630 is received, the receiving terminal 350 may terminate the output of the message object 1630 and output the display object 1610. In this case, the receiving terminal 350 may output a message confirmation available time 1670 at a position adjacent to the display object 1610. In this regard, the message confirmation available time 1670 may be calculated by a difference between the message confirmation end time 1631 and a current time and may be a remaining time to unseal the sealed message. Accordingly, in the case that the message confirmation end time 1631 is expired or the message confirmation available time 1670 is exhausted, the receiving terminal 350 may process the sealed message such that the sealed message is not unsealed.

Figure 17:
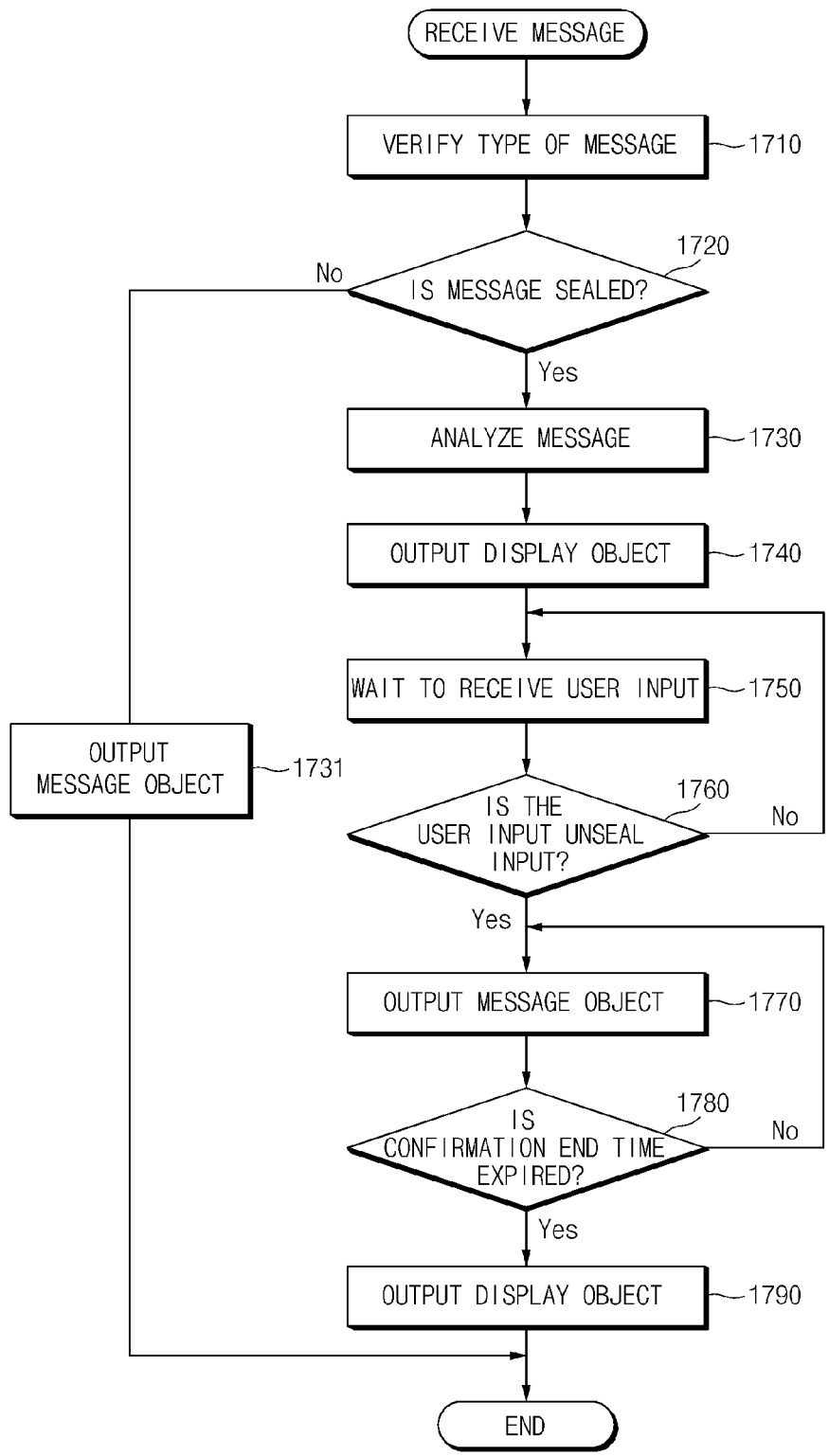
FIG. 17 is a flowchart of a method of operating an electronic device configured to confirm a message with which a confirmation end time is designated, according to an embodiment of the present disclosure.

FIG. 17 is a flowchart of a method of operating an electronic device configured to confirm a message with which a confirmation end time is designated, according to an embodiment of the present disclosure.

Referring to FIG. 17, when a message is received, the receiving terminal 350 may confirm the type of the received message in operation 1710. In addition, in operation 1720, the receiving terminal 350 may determine whether the received message is a sealed message. For example, the receiving terminal 350 may confirm message type information of the received message.

In the case that the received message is not the sealed message, the receiving terminal 350 may output a message object in operation 1731. In the case that the received message is the sealed message, the receiving terminal 350 may analyze the message in operation 1730. For example, the receiving terminal 350 may extract a display object, a message object, and seal-related information, which are included in the sealed message.

In operation 1740, the receiving terminal 350 may output the extracted display object. In operation 1750, the receiving terminal 350 may wait to receive a user input with respect to the display object.

When the user input is received with respect to the display object, the receiving terminal 350 may determine whether the user input is an unseal input in operation 1760. For example, the receiving terminal 350 may determine whether the received user input is a user input designated as the unseal input. The receiving terminal 350 may store information on the user input designated as the unseal input, e.g., gesture input information, into the memory 150. In the case that the user input is not the unseal input, the receiving terminal 350 may perform the operation 1750 again.

In the case that the user input is the unseal input, the receiving terminal 350 may output the message object sealed with a corresponding display object in operation 1770. In addition, the receiving terminal 350 may confirm message confirmation time information of the seal-related information. In the case that the message confirmation end time is designated, the receiving terminal 350 may output the message confirmation end time with the message object.

In operation 1780, the receiving terminal 350 may determine whether the message confirmation end time is expired. The receiving terminal 350 may confirm a message confirmation available time. For example, the receiving terminal 350 may calculate a difference between a current time and the message confirmation end time and confirm a remaining time.

In the case that the message confirm end time is not expired, the receiving terminal 350 may maintain the output of the message object. In the case that the message confirm end time is expired, the receiving terminal 350 may terminate the output of the message object and output the display object in operation 1790.

Figure 18:
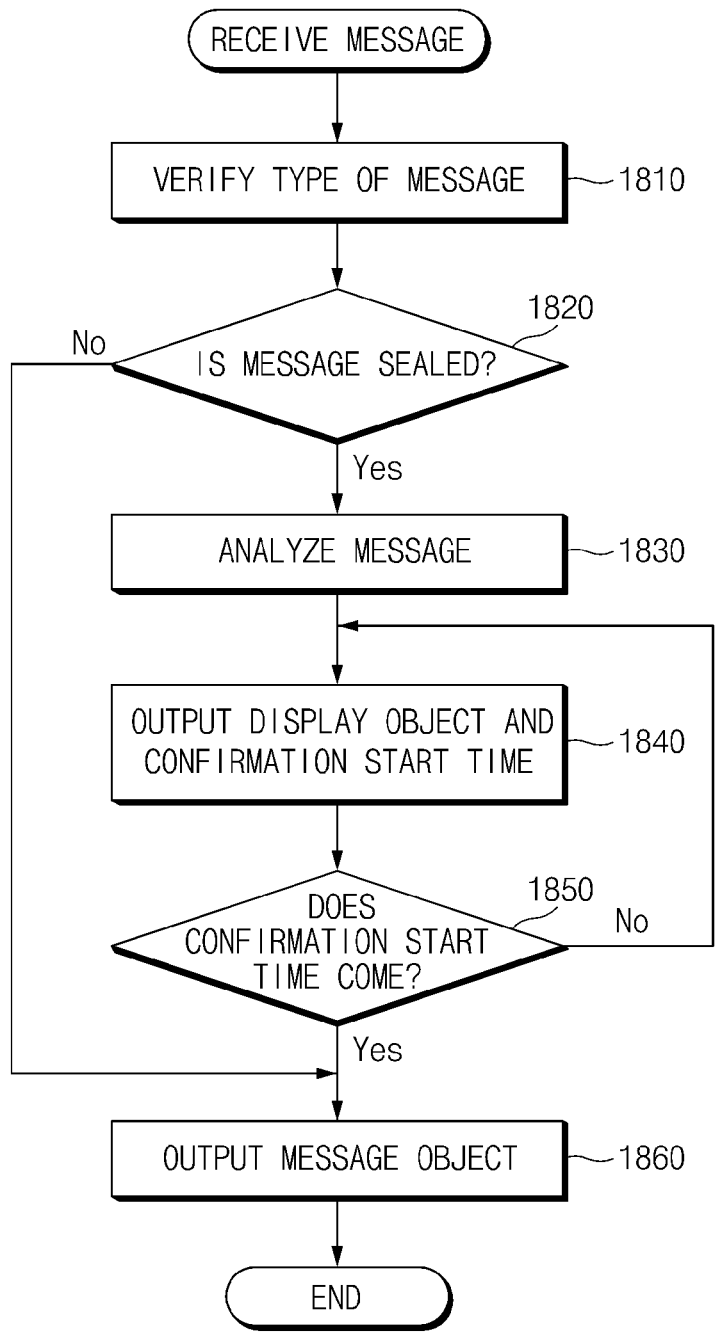
FIG. 18 is a flowchart of a method of operating an electronic device configured to confirm a message with which a confirmation start time is designated, according to an embodiment of the present disclosure.

FIG. 18 is a flowchart of a method of operating an electronic device configured to confirm a message with which a confirmation start time is designated, according to an embodiment of the present disclosure.

Referring to FIG. 18, when a message is received, the receiving terminal 350 may confirm the type of the received message in operation 1810. In addition, in operation 1820, the receiving terminal 350 may determine whether the received message is a sealed message.

In the case that the received message is the sealed message, the receiving terminal 350 may analyze the sealed message in operation 1830. For example, the receiving terminal 350 may extract a display object, a message object, and seal-related information, which are included in the sealed message.

In operation 1840, the receiving terminal 350 may output the extracted display object. In addition, the receiving terminal 350 may confirm the message confirmation time information of the seal-related information. In the case that the message confirmation start time is designated, the receiving terminal 350 may output the message confirmation start time with the display object.

In operation 1850, the receiving terminal 350 may determine whether the message confirmation start time comes. In the case that the message confirmation start time does not come, the receiving terminal 350 may maintain the output of the display object and the message confirmation start time. In the case that the message confirmation start time comes, the receiving terminal 350 may output the message object in operation 1860.

According to various embodiments, in the case that the message confirmation start time is designated, the receiving terminal 350 may process the sealed message such that the seal is not unsealed when the message confirmation start time does not come even though the unseal input is received with respect to the display object. Alternatively, even though the message confirmation start time comes, the receiving terminal 350 may process the seal 3e message such that the seal is not unsealed when the unseal input is not received with respect to the display object. When the message confirmation start time comes, the receiving terminal 350 may process the sealed message such that the sealed message is unsealed even though the unseal input with respect to the display object is not received.

According to various embodiments, the message confirmation start time and the message confirmation end time may be designated together. In this case, the receiving terminal 350 may determine whether the message confirmation start time comes or the message confirmation end time is expired to process unsealing of the message. In addition, in the case that the message confirmation time is designated, the receiving terminal 350 may output the message confirmation time through the voice output device together with the display of the corresponding message.

Figure 19:
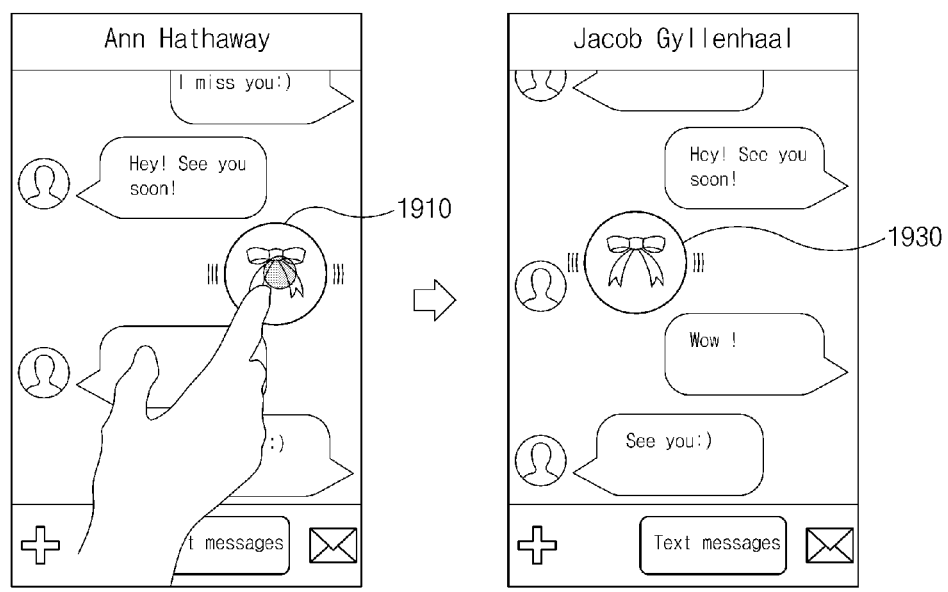
FIG. 19 is a diagram showing a screen related to processing of a user input with respect to a message, according to an embodiment of the present disclosure.

FIG. 19 is a diagram showing a screen related to processing of a user input with respect to a message, according to an embodiment of the present disclosure. The transmitting terminal 310 may process a user input generated with respect to the message that is already transmitted and may transmit the processed result to the receiving terminal 350.

Referring to FIG. 19, the transmitting terminal 310 may receive a user input with respect to the message output in the transmission/reception message content (e.g., the transmission/reception message content 820 of FIG. 8A). For example, the transmitting terminal 310 may receive a specific gesture input with respect to a display object 1910 of the sealed message that is already transmitted. FIG. 19 shows a screen in which the user inputs a gesture of shaking the display object 1910 from side to side. In this regard, the user input with respect to the sealed message that is already transmitted may include an input (e.g., a click or tap) selecting a message object or a display object included in the displayed sealed message or a gesture input with respect to a message object or a display object included in the displayed sealed message.

According to various embodiments, when the transmitting terminal 310 receives the user input with respect to the sealed message that is already transmitted, the transmitting terminal 310 may include identification information of a corresponding sealed message and the type of user input in a specific signal and transmit the specific signal to the receiving terminal 350. As another example, the transmitting terminal 310 may include emphasis effect information (e.g., effect causing a vibration during a designated time period or effect changing a color, background color, thickness, shape of boundary, or transparency of the display object) designated in accordance with the type of user input in the specific signal with the identification information of the corresponding sealed message and may transmit the specific signal to the receiving terminal 350. In this regard, the specific signal may include a control signal used to transmit and receive the message. In addition, the transmitting terminal 310 may generate a message including the type of the user input or the emphasis effect information in accordance with the type of user input and transmit the generated message to the receiving terminal 350. In this case, due to a pre-specified protocol between the transmitting terminal 310 and the receiving terminal 350, the receiving terminal 350 may confirm that the message is to process the user input with respect to the transmission/reception sealed message already transmitted other than a general message.

According to various embodiments, when the transmitting terminal 310 processes the user input with respect to the sealed message already transmitted, the transmitting terminal 310 may not process the user input in the case that the receiving terminal 350 has already confirmed the corresponding sealed message. In this regard, the transmitting terminal 310 may determine whether the receiving terminal 350 has confirmed the corresponding sealed message based on a confirmation response signal. For example, when the receiving terminal 350 confirms the corresponding sealed message, includes a specific identifier (e.g., a keyword) indicating whether the corresponding sealed message is confirmed by the receiving terminal 350 in a specific control signal (e.g., acknowledge (ACK) signal), and transmits the specific control signal to the transmitting terminal 310, the transmitting terminal 310 may confirm the specific identifier included in the specific control signal and determine whether the corresponding sealed message is confirmed. The above-described method may be performed by using a designated field (e.g., a field of a delivery report or a read report of MMS) of a specific signal provided by a message transmission/reception service or a similar way.

The receiving terminal 350 may receive the identification information of the specific sealed message and the type of user input or the emphasis effect information designated in accordance with the type of the user input from the transmitting terminal 310. The receiving terminal 350 may search the corresponding sealed message in the received message based on the identification information of the sealed message. Transmission/reception message content may be scrolled and aligned such that the corresponding sealed message is displayed at a predetermined area (e.g., a center area) of the screen. In addition, the receiving terminal 350 may apply the emphasis effect to the corresponding sealed message based on the type of user input or the emphasis effect information designated in accordance with the type of user input. The receiving terminal 350 may change an output state of a display object 1930 included in the corresponding sealed message. For example, the receiving terminal 350 may change a color, background color, thickness, shape of boundary, or transparency of the display object 1930. In addition, the receiving terminal 350 generates a vibration in the electronic device during a designated time period and may output a voice instructing the user to confirm the message through a voice output device. In FIG. 19, the receiving terminal 350 shows a screen in which a display position of the display object 1930 is changed at a predetermined time interval such that the display object 1930 shakes from side to side.

Figure 20:
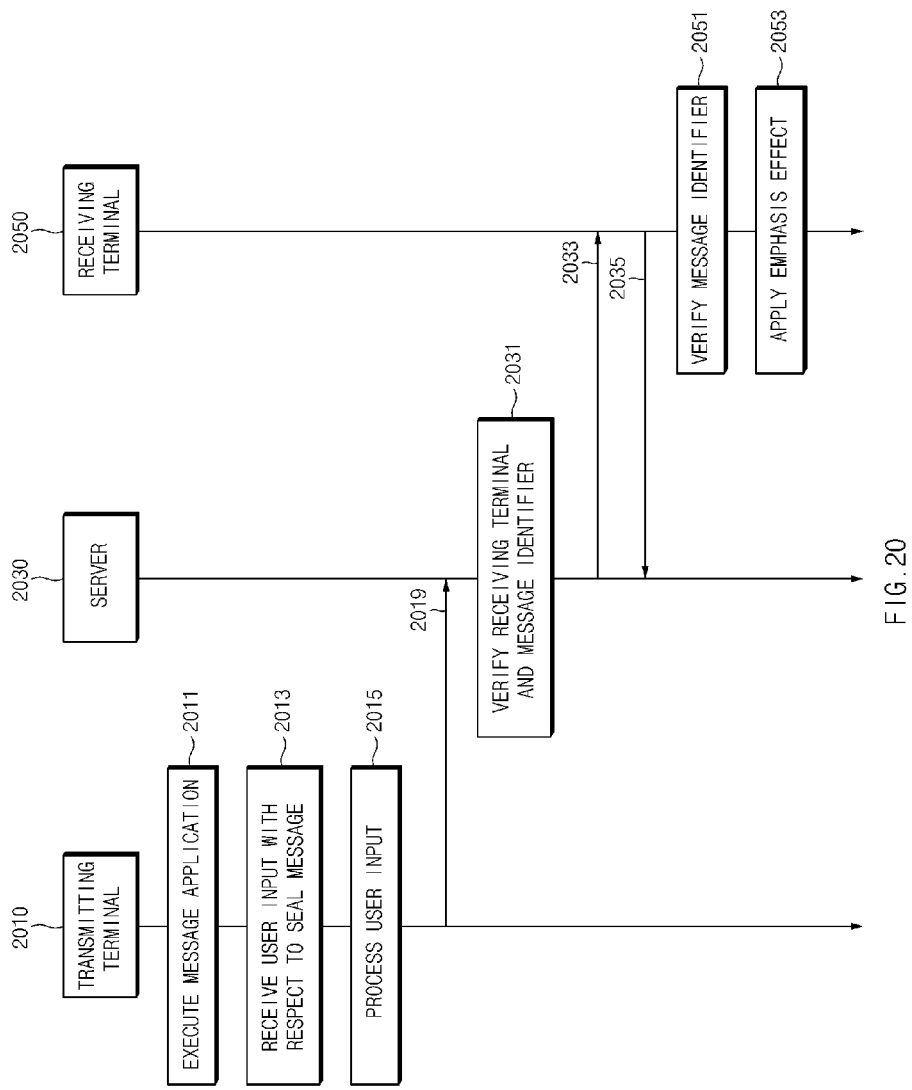
FIG. 20 is a flowchart of a method for processing a user input with respect to a message from a system configured for message processing, according to an embodiment of the present disclosure.

FIG. 20 is a flowchart of a method for processing a user input with respect to a message from a system configured for message processing, according to an embodiment of the present disclosure.

Referring to FIG. 20, a transmitting terminal 2010 may perform a message application in operation 2011. In this case, the transmitting terminal 2010 may output a screen for confirming message historical information. The screen in which the message historical information are confirmed may include the transmission/reception message content (e.g., the transmission/reception message content 820 of FIG. 8A).

In operation 2013, the transmitting terminal 2010 may receive a user input with respect to a sealed message that is already transmitted. For example, the transmitting terminal 2010 may receive the user input with respect to a display object included in a specific sealed message in the screen in which the message historical information are confirmed.

In operation 2015, the transmitting terminal 2010 may process the received user input. For example, the transmitting terminal 2010 may confirm identification information of a corresponding sealed message, receiving terminal designation information, and the type of user input. The transmitting terminal 2010 may confirm emphasis effect information designated in accordance with the type of user input.

In operation 2019, the transmitting terminal 2010 may request a server 2030 to transmit the identification information of the sealed message and the type of user input or the emphasis effect information designated in accordance with the type of user input to a receiving terminal 2050. In this case, the transmitting terminal 2010 may transmit receiving terminal designation information to the server 2030 with corresponding information.

In operation 2031, the server 2030 may confirm the receiving terminal 2050 based on the receiving terminal designation information and confirm the identification information of the sealed message included in the received information. In operation 2033, the server 2030 may transmit the identification information of the sealed message and the type of user input or the emphasis effect information designated in accordance with the type of user input to the receiving terminal 2050. In operation 2035, the receiving terminal 2050 may transmit a transmission response with respect to the received information to the server 2030.

In operation 2051, the receiving terminal 2050 may confirm the identification information of the sealed message included in the received information and search the sealed message corresponding to the identification information of the sealed message. In the case that the message corresponding to the identification information of the sealed message does not exist (e.g., the corresponding sealed message is deleted), the receiving terminal 2050 may not perform operations following the operation 2051. In addition, the receiving terminal 2050 may output a display object or voice information indicating that the corresponding sealed message is deleted.

In operation 2053, the receiving terminal 2050 may apply the emphasis effect to the message corresponding to the identification information of the sealed message. For example, the receiving terminal 2050 may apply the emphasis effect to the corresponding sealed message based on the type of user input or the emphasis effect information designated in accordance with the type of the user input.

Figure 21:
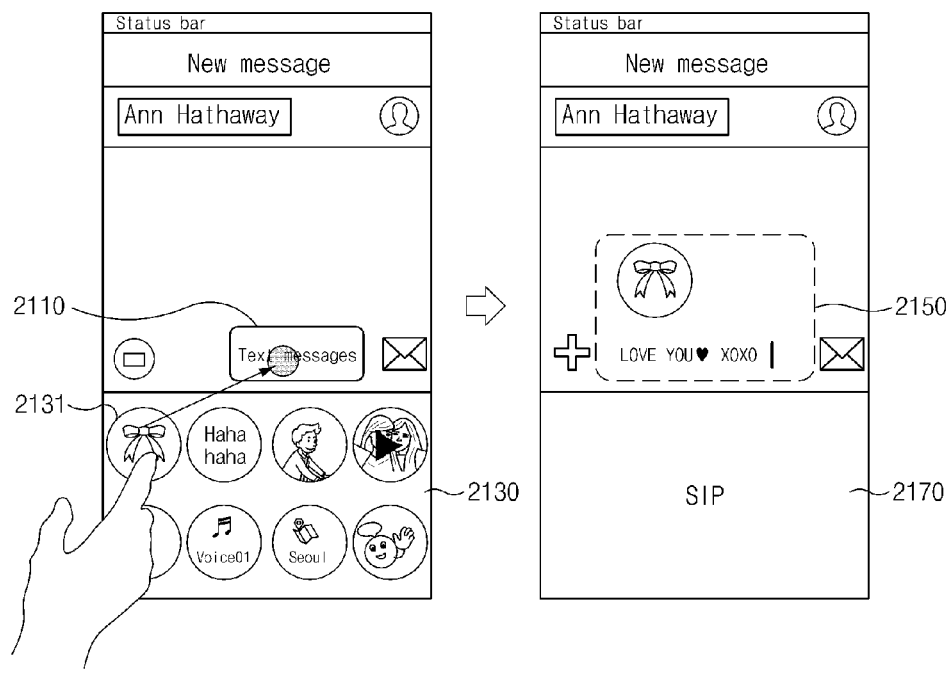
FIG. 21 is a diagram showing a screen reusing a sealed message based on historical information of a seal function, according to an embodiment of the present disclosure.

FIG. 21 is a diagram showing a screen reusing a sealed message based on historical information of a seal function, according to an embodiment of the present disclosure.

Referring to FIG. 21, the transmitting terminal 310 may output a message creation screen based on the historical information of the seal function. The transmitting terminal 310 may output a message input object 2110 and a sealed message selection screen 2130 when the transmitting terminal 310 receives a specific menu button (e.g., a seal message display button) selection input or a specific function input (e.g., a gesture input designated to display the sealed message). In this regard, the sealed message selection screen 2130 may be configured to select the sealed messages transmitted, received, or generated based on the historical information of the seal function.

According to various embodiments, when the specific sealed message 2131 is selected in the seal message selection screen 2130, the transmitting terminal 310 may output at least one display object and at least one message object, which is included in the sealed message 2131. The transmitting terminal 310 may sequentially output content sealed in each seal stage as an object (e.g., image or icon) designated in accordance with the type of the corresponding content through a display area of the message input object 2110. For example, in the case that the type of the content is a text, the content may be displayed in the icon with a "T" shape, and in the case that the type of the content is the image, the content may be displayed in a thumb nail image.

According to various embodiments, the transmitting terminal 310 may replace the message input object 2110 with an enlarged message input object 2150 having a relatively large display area to display the content sealed in each seal stage in detail. In this case, the transmitting terminal 310 may sequentially output the content included in the sealed message 2131 depending on a seal order. For instance, in the case that the type of the content is a text, the transmitting terminal 310 may output all or a portion of the text, and in the case that the type of the content is the image or icon, the transmitting terminal 310 may output the thumb nail image or the corresponding icon of the corresponding image. In addition, in the case that the type of the content is audio, the transmitting terminal 310 may output an object indicating a reproduction state of an audio reproducing device reproducing the corresponding audio or property information (e.g., a filename) of the corresponding audio. In the case that the type of the content is video, the transmitting terminal 310 may output an object indicating a reproduction state of a video reproducing device reproducing the corresponding video, a thumb nail image of the corresponding video, or property information of the corresponding video.

FIG. 21 shows a screen in which the specific sealed message 2131 is drag and drop to the message input object 2110 in the seal message selection screen 2130 after being selected. According to various embodiments, when the sealed message 2131 is selected, the transmitting terminal 310 may terminate the output of the seal message selection screen 2130 and output a soft input panel 2170.

Figure 22:
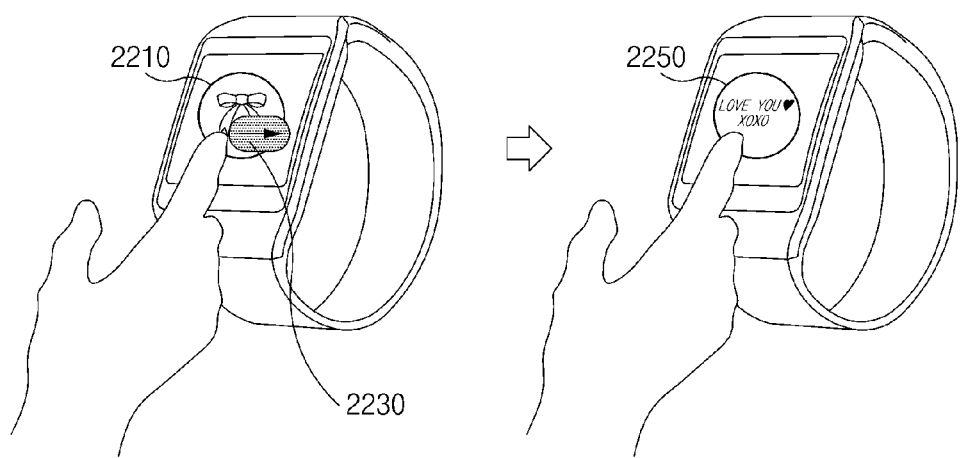
FIG. 22 is a diagram showing a screen confirming a message based on an electronic device connected through a communication interface, according to an embodiment of the present disclosure.

FIG. 22 is a diagram showing a screen confirming a message based on an electronic device connected through a communication interface, according to an embodiment of the present disclosure.

Referring to FIG. 22, the receiving terminal 350 may confirm the received message based on the electronic device connected through the communication interface (e.g., the communication interface 130 of FIG. 1). In this regard, the transmitting terminal 310 may include client information (e.g., the client information 723 of FIG. 7) in the seal-related information and transmit the seal-related information. For example, the transmitting terminal 310 may include an electronic device designation information, which outputs the content included in the sealed message, in the sealed message and transmit the sealed message to the receiving terminal 350.

According to various embodiments, in the case that a receiving terminal (e.g., the first electronic device 210 of FIG. 2) and an electronic device (e.g., the second electronic device 230 of FIG. 2) connected to the receiving terminal 350 through the communication interface are designated as an output device of the sealed message, the corresponding sealed message may be confirmed through not only the receiving terminal 350 but also the electronic device connected to the receiving terminal 350. FIG. 22 shows a screen in which the sealed message is confirmed through the electronic device connected to the receiving terminal 350. For example, the receiving terminal 350 may transmit the corresponding sealed message to the electronic device connected to the receiving terminal 350 based on the client information when the sealed message is received. The electronic device may analyze the sealed message and output a display object 2210 included in the sealed message. In addition, the electronic device may output a message object 2250 when a gesture input 2230 designated as the unseal input with respect to the display object 2210 is input to the display object 2210.

According to various embodiments, when the sealed message is received, the receiving terminal 350 may receive only a control command with respect to the electronic device to be involved in the output of the corresponding sealed message instead of transmitting the corresponding sealed message to the electronic device. For example, in the case that the electronic device may not process the sealed message, the receiving terminal 350 may directly analyze the sealed message and extract the display object 2210, the message object 2250, and the seal-related information. In addition, the receiving terminal 350 may transmit the display object 2210 to the electronic device, and the electronic device may output the display object 2210. When the gesture input 2230 designated as the unseal input with respect to the display object 2210 is input, the electronic device may request the transmission of the message object 2250 to the receiving terminal 350. The receiving terminal 350 may transmit the extracted message object 2250 to the electronic device in response to the request from the electronic device, and the electronic device may output the message object 2250.

According to various embodiments, the electronic device may reprocess the content in consideration of characteristics of the device and output the reprocessed content. For example, in the case that the electronic device is a wearable device, the electronic device may reduce the content in a relatively small scale and output the reduced content. As another example, the receiving terminal 350 may reprocess the content in consideration of characteristics of the electronic device and transmit the reprocessed content to the electronic device.

Figure 23:
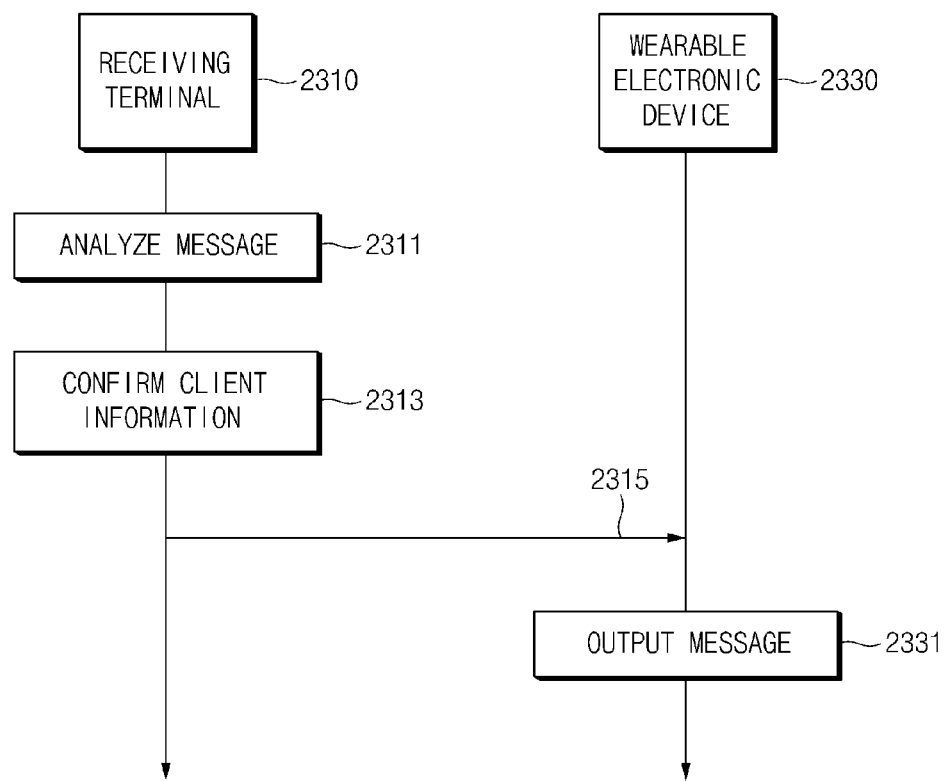
FIG. 23 is a flowchart of a method of operating an electronic device configured to confirm a message based on an electronic device connected through a communication interface, according to an embodiment of the present disclosure.

FIG. 23 is a flowchart of a method of operating an electronic device configured to confirm a message based on an electronic device connected through a communication interface, according to an embodiment of the present disclosure.

Referring to FIG. 23, when a receiving terminal 2310 receives a message, the receiving terminal 2310 may analyze the received message in operation 2311. For example, the receiving terminal 2310 may determine whether the received message is a sealed message. In addition, in the case that the received message is the sealed message, the receiving terminal 2310 may extract at least one display object, at least one message object, and seal-related information, which are included in the sealed message.

In operation 2313, the receiving terminal 2310 may confirm client information in the seal-related information. For example, the receiving terminal 2310 may confirm electronic device designation information of the electronic device through which the content in each seal stage is output. The receiving terminal 2310 may reprocess the received message based on the electronic device designation information of the electronic device through which the content in each seal stage is output.

In operation 2315, the receiving terminal 2310 may transmit a message to a wearable electronic device 2330 based on the electronic device designation information. The receiving terminal 2310 may transmit the reprocessed message to the wearable electronic device 2330 based on the electronic device designation information. In the case that the wearable electronic device 2330 may not process the sealed message, the receiving terminal 2310 may transmit the extracted display object and the extracted message object. In operation 2331, the wearable electronic device 2330 may output the received message or the extracted display and message objects.

Figure 24:
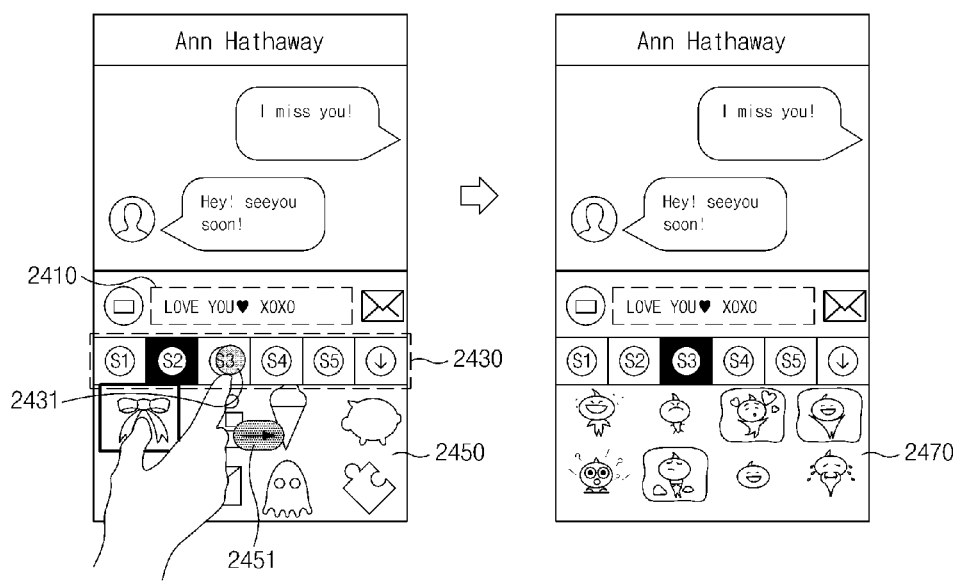
FIG. 24 is a diagram of display objects that are distinguished from each other by the types of the display objects, according to an embodiment of the present disclosure.

FIG. 24 is a diagram of display objects that are distinguished from each other by the types of the display objects, according to an embodiment of the present disclosure.

Referring to FIG. 24, the transmitting terminal 310 may output a message creation screen configured to include a message input object 2410, a display object type selection object 2430, and a display object selection screen 2450. The display object type selection object 2430 may include category item buttons allowing display objects supported by the transmitting terminal to be output after being separated by types thereof. FIG. 24 shows the display object type selection object 2430 in which the category item buttons are aligned in one line. The display object type selection object 2430 may be included in the display object selection screen 2450. For example, the display objects separated depending on the type thereof may be output through the display object selection screen 2450 realized in a page manner after being aligned depending on the type thereof. In this case, the display object type selection object 2430 may be included in the display object selection screen 2450 and may serve as a button to switch the page.

According to various embodiments, the transmitting terminal may output the display objects included in a selected category item in response to the selection of the specific category item button 2431 included in the display object type selection object 2430. For example, responsive to the selection of the specific category item button 2431, the transmitting terminal may replace the display object selection screen 2450 with a display object selection screen configured to select the display objects included in the selected category item. When a specific gesture input 2451 is received with respect to the display object selection screen 2450, the transmitting terminal 310 may display the display objects included in a previous category item or a next category item.

According to various embodiments, the transmitting terminal 310 may download the display objects supported by the transmitting terminal 310 from a specific server (e.g., a content providing server). In addition, the transmitting terminal 310 may store the downloaded content into the memory 150.

Figure 25:
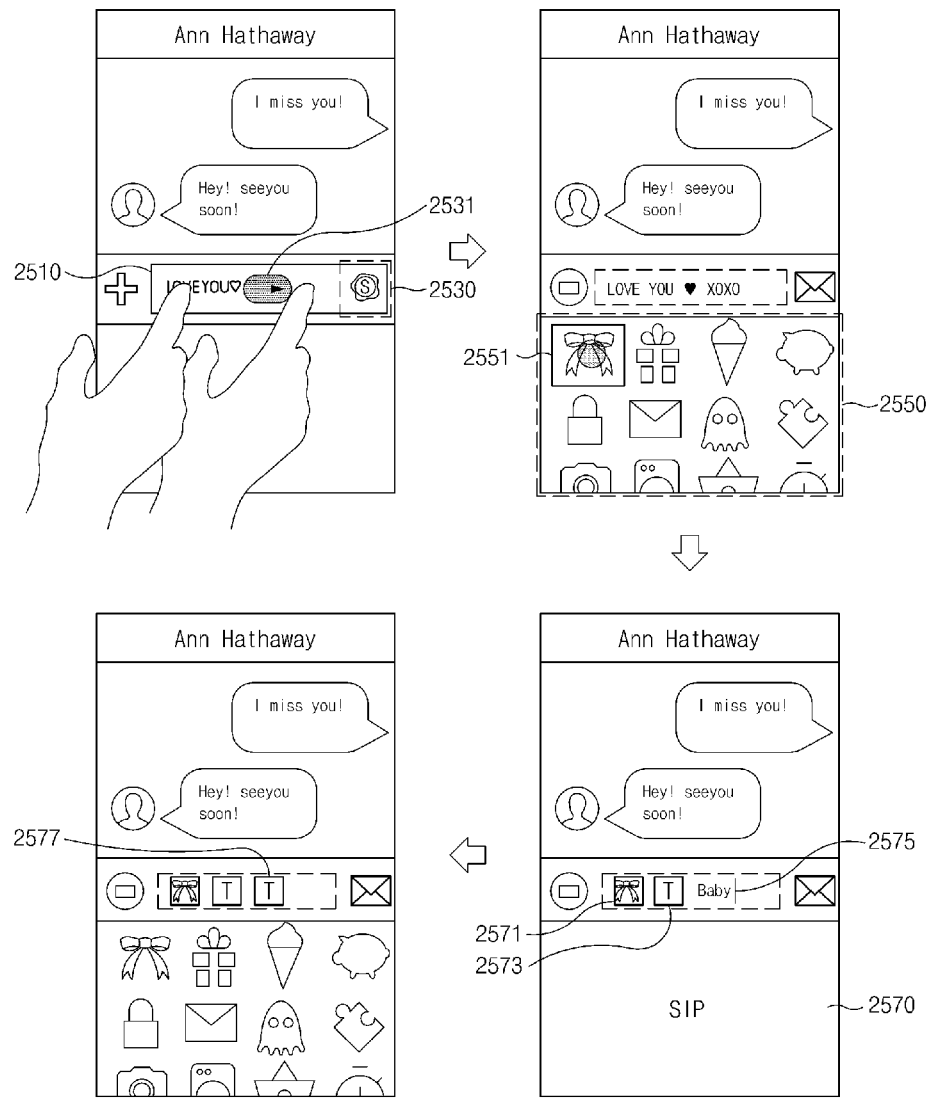
FIG. 25 is a diagram showing a screen sealing content in each seal stage, according to an embodiment of the present disclosure.

FIG. 25 is a diagram showing a screen sealing content in each seal stage, according to an embodiment of the present disclosure.

Referring to FIG. 25, the transmitting terminal 310 may generate a sealed message through several seal stages. For example, when a gesture input 2531 designated as a seal input with respect to a message input object 2510 is received in a message creation screen, the transmitting terminal 310 may output a display object selection screen 2550. In this case, a first message object may be output through a display area of the message input object 2510. In FIG. 25, a specific text is output through the display area of the message input object 2510 as the first message object.

When the first display object 2551 is selected in the display object selection screen 2550, the transmitting terminal 310 may output the first message object and the first display object 2551 through the display area of the message input object 2510. The transmitting terminal may output the display object and the message object through the display area of the message input object 2510 using a designated object (e.g., an image or icon) in accordance with the type of the content. For example, in the case that the type of the content is a text, the transmitting terminal 310 may output the content in the icon with a "T" shape, and in the case that the type of the content is the image or icon, the transmitting terminal 310 may output the content in a thumb nail image of a corresponding image or a corresponding icon. In addition, in the case that the type of the content is an audio or a video, the transmitting terminal 310 may output an icon associated with the audio or video. In FIG. 25, the transmitting terminal 310 outputs the thumb nail image of the first display object 2551 as an indication object 2571 of the first display object 2551 and outputs the icon with the "T" shape indicating the first message object as an indication object 2573 of the first message object.

According to various embodiments, when the seal button 2530 is selected under a state in which the first message object is sealed with the first display object 2551 or a gesture input 2531 designated as a seal input with respect to the message input object 2510 is received, the transmitting terminal 310 may designate the first message object to a second display object and receive a second message object. For instance, the transmitting terminal 310 may output the indication object 2571 of the first display object 2551 and the indication object 2573 of the first message object through the display area of the message input object 2510 and display a cursor 2575 designating an input position. In addition, the transmitting terminal 310 may output a soft input panel 2570 in response to the message input object 2510.

According to various embodiments, when the seal button 2530 is selected after the second message object is input, the transmitting terminal 310 may output the indication object 2571 of the first display object 2551, the indication object 2573 of the first message object, and the indication object 2577 of the second message object in the display area of the message input object 2510. When a specific gesture input is received while the second message object is input, the transmitting terminal 310 may output the display object selection screen 2550 to select the image or icon. Alternatively, the transmitting terminal 310 may output a screen for selecting various kinds of content stored in the memory 150 in response to the selection of the content add button (e.g., the content add button 1230 of FIG. 12A). Accordingly, the transmitting terminal 310 may output the designated object in accordance with the type of the content selected to the second message object through the display area of the message input object 2510 as the indication object 2577 of the second message object. The transmitting terminal 310 may generate the sealed message configured to include at least one display object and at least one message object and sealed through several seal stages by repeatedly performing the above-mentioned operations.

According to various embodiments, when the gesture input 2531 designated as the seal input with respect to the message input object 2510 is received, the transmitting terminal 310 may output the display object selection screen 2550 without the input or selection of the first message object. In addition, when the specific display object 2551 is selected through the display object selection screen 2550, the transmitting terminal 310 may generate the sealed message using only the first display object without the input or selection of the first message object. In this case, when the selection of the seal button 2530 or the gesture input 2531 designated as the seal input with respect to the message input object 2510 is received in the state in which the sealed message is generated using only the first display object, the transmitting terminal 310 may receive the first message object.

According to various embodiments, the transmitting terminal 310 may receive the input or selection of the second message object without the selection of the first display object after the input or selection of the first message object. For example, when the gesture input 2531 designated as the seal input with respect to the message input object 2510 is received after the input or selection of the first message object, the transmitting terminal 310 may output the display object selection screen 2550. In this case, the transmitting terminal 310 may display the cursor 2575 in response to the selection of the message input object 2510 without the selection of the display object and output the soft input panel 2570 after terminating the output of the display object selection screen 2550. Thus, the transmitting terminal 310 may receive the input of the second message object through the soft input panel 2570. When the second message object is input or selected after the first message object is input or selected without the selection of the first display object, the transmitting terminal 310 may designate the first message object to the first display object and seal the second message object with the first display object (e.g., the first message object). In addition, each of the message objects sequentially input is used to seal a next message object thereof as the display object.

Figure 26:
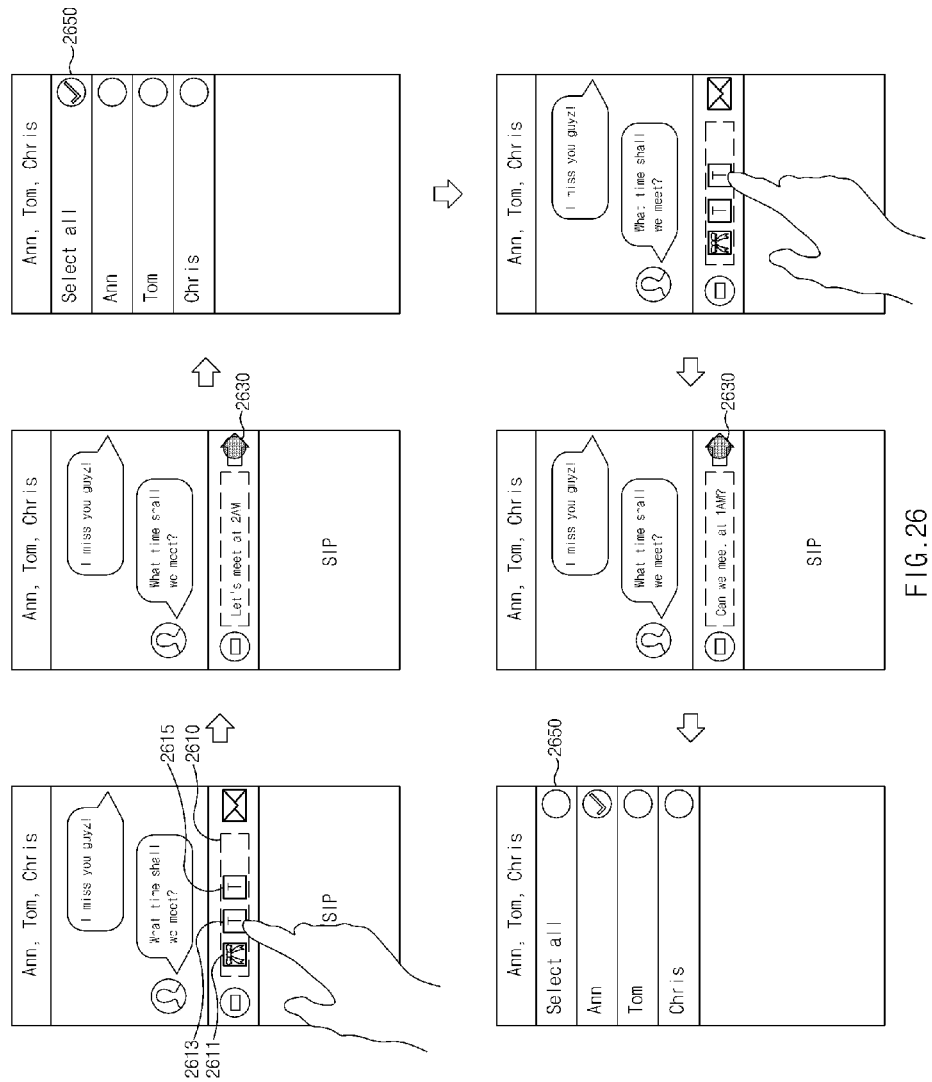
FIG. 26 is a diagram showing a screen related to designation of a receiving terminal of a sealed message in each seal stage, according to an embodiment of the present disclosure.

FIG. 26 is a diagram showing a screen related to designation of a receiving terminal of a sealed message in each seal stage, according to an embodiment of the present disclosure.

Referring to FIG. 26, the transmitting terminal 310 may designate a receiving terminal in each seal stage with respect to a message sealed in each seal stage. The transmitting terminal 310 may output an indication object 2611 of a first display object, an indication object 2613 of a first message object, and an indication object 2615 of a second message object in a display area of a message input object 2610. The first message object may correspond to a display object of the second message object and may be referred to as a second display object. In addition, the sealed message may be sealed in a larger number, and thus the transmitting terminal may output the display object and the indication object of the message object in the display area of the message input object 2610 in the sealed order.

According to various embodiments, when the display object and the indication object output to the display area of the message input object 2610 are selected, the transmitting terminal 310 may output the corresponding display object or the content of the message object to the display area of the message input object 2610. FIG. 26 shows a screen in which the transmitting terminal 310 outputs the content (e.g., a text of "Let's meet at 2 AM") of the first message object in the display area of the message input object 2610 in response to the selection of the indication object 2613 of the first message object. In addition, the transmitting terminal 310 may replace the message transmission button with a receiving terminal designation button 2630.

According to various embodiments, the transmitting terminal 310 may output a receiving terminal designation screen 2650 in a pop-up method or in a screen changing method in response to the receiving terminal designation button 2630. In addition, responsive to a selection of a specific item displayed in the receiving terminal designation screen 2650, the transmitting terminal 310 may designate a receiving terminal indicated by the item to the receiving terminal of the corresponding content. The receiving terminal designation screen 2650 may include a selection button such that a plurality of receiving terminals are selected. The transmitting terminal 310 may output the receiving terminal designation screen 2650 when the display object or the message object is selected or input in each seal stage.

Figure 27A:
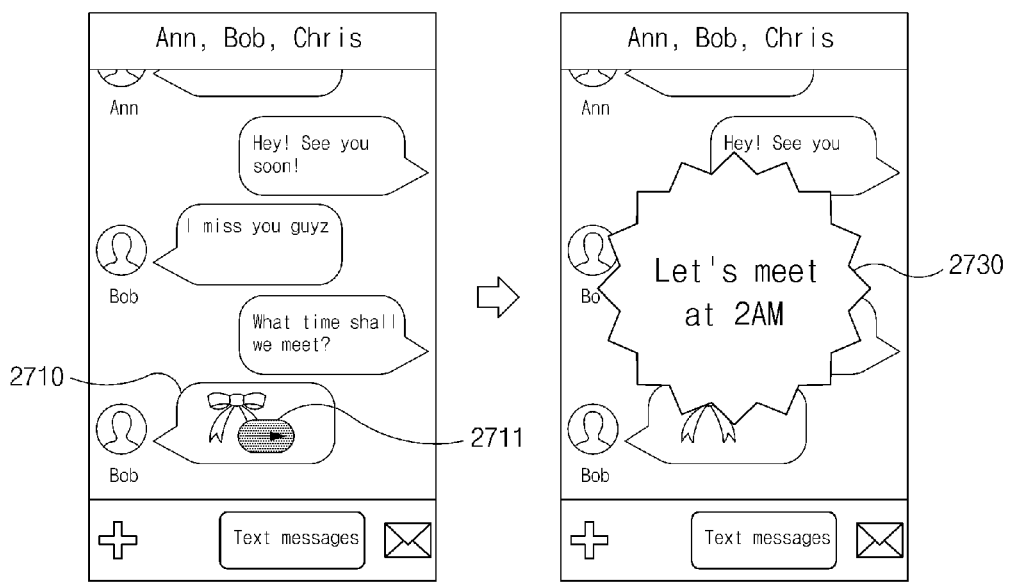
FIG. 27A is a diagram showing a screen related to confirmation of the sealed message using the designated receiving terminal, according to an embodiment of the present disclosure.

FIG. 27A is a diagram showing a screen related to confirmation of the seal message using the designated receiving terminal, according to an embodiment of the present disclosure.

Referring to FIG. 27A, when the message sealed in each seal stage is received, the receiving terminal 350 may output a display object 2710 included in the received sealed message. The display object 2710 may be a top-priority display object in which the receiving terminal 350 is included in receiving terminal designation information among display objects included in a sealed message. For example, the display object 2710 may be a first display object included in the sealed message sealed in each seal stage.

According to various embodiments, when a gesture input 2711 designated as an unseal input with respect to the display object 2710 is received, the receiving terminal 350 may output a message object 2730. The message object 2730 may be a top-priority message object in which the receiving terminal 350 is included in the receiving terminal designation information of a corresponding message object among the message objects sealed with the display object 2710. For example, the message object 2730 may be a first message object sealed with a first display object.

According to various embodiments, in the case that a content in which the receiving terminal 350 is included in the receiving terminal designation information exists except for the content presently output among the display object or the message object included in the sealed message sealed in each seal stage, the receiving terminal 350 may display an object indicating that a next content exists at a position adjacent to the presently-displayed content. The receiving terminal may output a right-facing arrow image at a right lower end of a boundary of the presently-displayed content. In addition, the receiving terminal 350 may output voice information through a voice output device to indicate the existence of the next content.

Figure 27B:
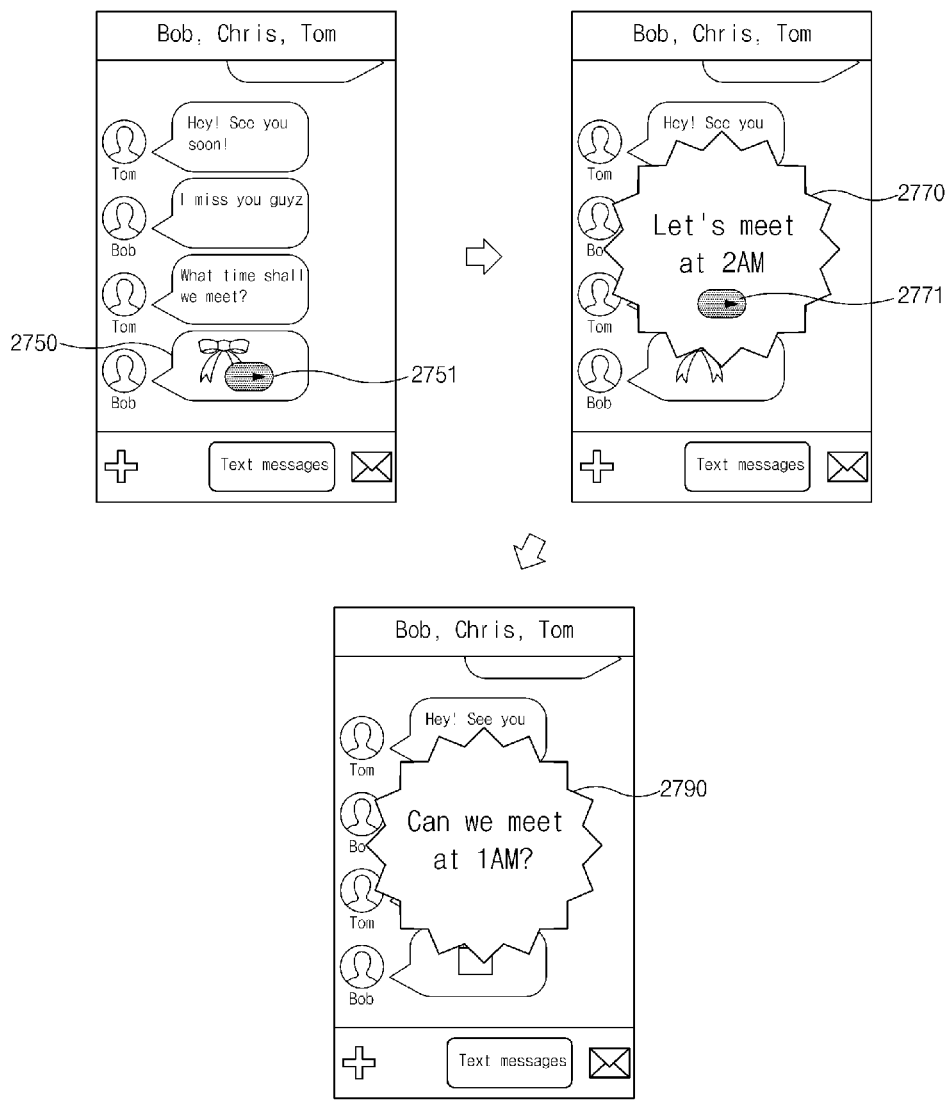
FIG. 27B is a diagram showing another example of a screen related to confirmation of the sealed message using the designated receiving terminal, according to an embodiment of the present disclosure.

FIG. 27B is a diagram showing another example of a screen related to confirmation of the sealed message using the designated receiving terminal, according to an embodiment of the present disclosure.

Referring to FIG. 27B, the receiving terminal 350 may confirm a sealed message sealed in another seal stage through a process that is similar to or same as the message confirm process described with reference to FIG. 27A. For example, when a gesture input 2751 designated as an unseal input with respect to a first display object 2750 is received, the receiving terminal 350 may output a first message object 2770. In addition, when a gesture input 2771 designated as an unseal input with respect to a second display object (first message object 2770) is received, the receiving terminal 350 may output a second message object 2790.

FIGS. 26, 27A, and 27B show screens in association with the transmission/reception of a group chat or message. For instance, FIG. 26 shows the screen in which a first user (e.g., a user named "Bob") transmits the message sealed in each seal stage to a second user (e.g., a user named "Tom"), a third user (e.g., a user named "Chris"), and a fourth user (e.g., a user named "Ann"). In addition, FIG. 27A shows the screen in which the second user confirms the received sealed message, and FIG. 27B shows the screen in which the fourth user confirms the received sealed message.

As shown in FIG. 26, the first user may designate different receiving terminals when the message sealed in each seal stage is generated. For example, the first user may designate all users (e.g., the second, third, and fourth users) as the receiving terminals of the first message object and designate only the fourth user as the receiving terminal of the second message object. In this case, the receiving terminal designation information on the first message object may include information on all users, and the receiving terminal designation information on the second message object may include only information on the fourth user. In addition, in the case that the first user does not designate the receiving terminal of the first display object, a transmitting terminal (e.g., an electronic device of the first user) may include the information on all users in the receiving terminal designation information in the first display object.

According to various embodiments, the server 330 may transmit all messages sealed in each seal stage to the second, third, and fourth users. In this case, the second and third users may not unseal the second display object and may not confirm the second message object. The server 330 may reprocess the message sealed in each seal stage based on t the receiving terminal designation information in each seal stage. For example, the server 330 may constitute the first display object and the first message object as a first sealed message and constitute the first display object, the first message object, and the second message object as a second sealed message. In this case, the server 330 may transmit the first sealed message to the second and third users and transmit the second sealed message to the fourth user.

FIGS. 27A and 27B show screens in which the messages reprocessed based on the receiving terminal designation information in each seal stage are respectively transmitted to corresponding receiving terminals. As shown in FIG. 27A, the second user may receive the first sealed message. Accordingly, the second user may confirm only the first message object (e.g., a message object having a text of "Let's meet at 2 AM"). In addition, as shown in FIG. 27B, the fourth user may receive the second sealed message. Thus, the fourth user may confirm the first and second message objects (e.g., a message object having a text of "Can we meet at 1 AM").

As described above, according to various embodiments, the method of processing the message using the electronic device may include receiving the user input to generate the message and sealing the second object corresponding to the input message content with the designated first object such that at least a portion of the second object corresponding to the first message content is not exposed.

According to various embodiments, the message processing method may further include outputting the second object when the user input designated as the unseal input with respect to the first object is received and outputting the first object when the user input designated as a seal input with respect to the second object is received.

According to various embodiments, the sealing of the message may further include outputting a screen for selecting the first object when the user input designated as the seal input with respect to the message input object inputting the message content is received.

According to various embodiments, the control operation of outputting the screen for selecting the first object may further include an operation of differently arranging content included in the screen for selecting the first object on the basis of at least one of the type of the second object, the content of the second object, the use historical information of the seal function, or the context information of the user.

According to various embodiments, the sealing of the message may further include at least one of an operation of allowing the client information including at least one of the receiving terminal designation information or the electronic device designation information, which are input during the message seal, to be included in the message and an operation of allowing the message confirmation time information including at least one of the message confirmation start time or the message confirmation end time, which are input during the message seal, to be included in the message.

According to various embodiments, the message processing method may further include at least one of an operation of selecting an output device outputting at least one of the first object or the second object included in the message on the basis of the client information included in the message during the reception of the message and an operation of determining whether at least one of the first object or the second object included in the message is output on the basis of the message confirmation time information included in the message.

According to various embodiments, the determining of the output of the first or second object may further include determining such that the second object is note output in the case that the message confirmation start time does not come even though the user input designated as the unseal input with respect to the first object is received, determining such that the second object is not output in the case that the user input designated as the unseal input with respect to the first object is not received even though the message confirmation start time comes, or determining such that the second object is output in the case that the message confirmation start time comes regardless of the reception of the user input designated as the unseal input with respect to the first object.

According to various embodiments, the determining of the output of the first or second object may further include at least one of determining such that the second object is not output in the case that the message confirmation end time is expired even though the user input designated as the unseal input with respect to the first object is received or terminating the output of the second object in the case that the message confirmation end time is expired while the second object is output.

According to various embodiments, when the designated user input is received with respect to the message that is already transmitted, the message processing method may further include transmitting the type of the user input or the emphasis effect information designated in accordance with the type of the user input to the receiving terminal of the message with the identification information of the message.

According to various embodiments, the message processing method may further include applying the designated emphasis effect to the message when at least one of the type of the user input or the emphasis effect information designated in accordance with the type of the user input is received with respect to the message that is already transmitted from the transmitting terminal with the identification information of the message.

According to various embodiments, the message processing method of the electronic device may include receiving the user input in association with the message generation, sealing the second object corresponding to the input first message content with the designated first object such that at least a portion of the second object is not exposed, and sealing the third object corresponding the second message content with at least one of the first object or the second object such that at least a portion of the third object is not exposed when an input corresponding to the second content occurs.

According to various embodiments, the message processing method may further include outputting the second object when the user input designated as the unseal input with respect to the first object is received and outputting the third object when the user input designated as the unseal input with respect to the second object is received.

According to various embodiments, the message processing method may further include outputting the first object when the user input designated as the seal input with respect to the second object is received and outputting at least one of the first object and the second object when the user input designated as the seal input with respect to the third object is received.

According to various embodiments, the sealing of the second object with the first object may further include allowing first receiving terminal designation information input during the seal of the second object to be included in the receiving terminal designation information in each seal stage included in the message, and the sealing of the third object such that at least the portion of the third object is not exposed may further include allowing second receiving terminal designation information input during the seal of the third object to be included in the receiving terminal designation information in each seal stage included in the message.

According to various embodiments, the message processing method may further include selecting an output device outputting at least one of the first object, the second object, or the third object included in the message on the basis of the receiving terminal designation information in each seal stage included in the message.

According to various embodiments, a method of processing a message using an electronic device, the method may include receiving a user input related to a message, when a first content of the message is input, sealing the message with a first object designated such that at least a portion of a second object corresponding to the first content is not exposed, and transmitting the sealed message to an external electronic device. The at least the portion of the second object may be exposed when an unseal input with respect to the first object occurs.

According to various embodiments, the first object and the second object may comprise a display object corresponding to at least one of a text, an image, an audio, and a video.

According to various embodiments, the message processing method may further include including client information comprising at least one of receiving terminal designation information indicating at least one electronic device is allowed to receive the sealed message and output device designation information indicating at least one output device which output the sealed message in the sealed message.

According to various embodiments, the message processing method may further include including message confirmation time information comprising at least one of a message confirmation start time and a message confirmation end time in the sealed message.

According to various embodiments, the message processing method may further include, when a user input with respect to the sealed message which is already transmitted to the external electronic device occurs, transmitting at least one of a type of the user input and emphasis effect information designated in accordance with the type of the user input to the external electronic device with identification information of the sealed message.

According to various embodiments, the message processing method may further include, when a second content of the message is input, sealing the sealed message with at least one of the first object and the second object such that at least a portion of a third object corresponding to the second content is not exposed.

According to various embodiments, a method of processing a message using an electronic device, the method may include receiving a sealed message including a first object and a second object from an external electronic device, displaying the sealed message with at least a portion of the second object is not exposed by the first object, and exposing at least the portion of the second object when an unseal input with respect to the first object occurs.

According to various embodiments, the message processing method may further include concealing at least the portion of the second object when a seal input with respect to the second object occurs.

According to various embodiments, the message processing method may further include, when the sealed message includes client information comprising at least one of receiving terminal designation information indicating at least one electronic device is allowed to receive the sealed message and output device designation information indicating at least one output device which output the sealed message, determining at least one of output of the sealed message based on the receiving terminal designation information and selection of the at least one output device outputting the sealed message based on the output device designation information.

According to various embodiments, the message processing method may further include, when the sealed message includes message confirmation time comprising at least one of a message confirmation start time and a message confirmation end time, determining output of the sealed message based on the message confirmation time.

According to various embodiments, the message processing method may further include performing at least one of determination that at least the portion of the second object is not exposed when the message confirmation start time is does not come even though the unseal input with respect to the first object occurs, determination that at least the portion of the second object is not exposed when the unseal input with respect to the first object does not occur even though the message confirmation start time comes, and determination that at least the portion of the second object is exposed when the message confirmation start time comes regardless of whether the unseal input with respect to the first object occurs.

According to various embodiments, the message processing method may further include performing at least one of determination that at least the portion of the second object is not exposed when the message confirmation end time is expired even though the unseal input with respect to the first object occurs and determination that at least the portion of the second object is concealed when the message confirmation end time is expired while the second object is exposed.

According to various embodiments, the message processing method may further include, when at least one of a type of a user input with respect to the sealed message which is already received from the external electronic device and emphasis effect information designated in accordance with the type of the user input is received with identification information of the sealed message, applying the emphasis effect to the sealed message.

According to various embodiments, since at least one content is sealed through at least one seal stage, the message may be edited in various ways.

In addition, since the message in which the content is sealed through at least one seal stage is transmitted, a connectivity between the messages is improved. Thus, the purpose of the message may be realized as an intention of the user, and the message may be expressed in various ways.

According to various embodiments, at least a portion of an apparatus (e.g., modules or functions thereof) or a method (e.g., operations/steps), for example, may be implemented by instructions stored in a non-transitory computer-readable storage media in the form of a programmable module. The instruction, when executed by one or more processors (e.g., the application processor), may perform a function corresponding to the instruction. The computer-readable storage media, for example, may be the memory.

A computer-readable recording media may include a hard disk, a floppy disk, a magnetic media (e.g., a magnetic tape), an optical media (e.g., compact disc read only memory (CD-ROM) and a digital versatile disc (DVD)), a magneto-optical media (e.g., a floptical disk), and a hardware device (e.g., read only memory (ROM), random access memory (RAM), a flash memory, or the like). Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

A module or a programming module may include at least one of the above elements, or a portion of the above elements may be omitted, or additional other elements may be further included. Operations performed by a module, a programming module, or other elements may be executed sequentially, in parallel, repeatedly, or in a heuristic method. Also, a portion of operations/steps may be executed in different sequences, omitted, or other operations may be added.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device comprising:
a touch screen display;
a memory configured to store one or more messages;
a communication interface configured to transmit a message to an external electronic device; and
a processor functionally connected to the touch screen display, the memory, and the communication interface, wherein the processor is configured to receive a first content of a message from a user via the touch screen display, display a first object to seal the first content of the message in response to a first gesture on the first content of the message, seal the first content of the message with the first object in response to a selection of the first object, transmit the sealed message through the communication interface to the external electronic device in response to a second gesture for sending the sealed message, display the sealed message as a transmitted message with one or more messages exchanged between the electronic device and the external electronic device on the touch screen display, and wherein the processor is configured to receive a touch gesture on a message sealed with a second object received from the external device on the touch screen display, and display the content of the message in response to the received touch gesture.

2. The electronic device of claim 1, wherein the first object and the second object comprise a display object corresponding to at least one of a text, an image, an audio, and a video.

3. The electronic device of claim 1, wherein the processor is further configured to include client information comprising at least one of receiving terminal designation information indicating at least one electronic device is allowed to receive the sealed message and output device designation information indicating at least one output device which outputs the sealed message in the sealed message.

4. The electronic device of claim 1, wherein the first object is displayed based on information of inputted content.

5. The electronic device of claim 1, wherein the processor is further configured to include message confirmation time information comprising at least one of a message confirmation start time and a message confirmation end time in the sealed message.

6. The electronic device of claim 1, wherein, when a user input with respect to the sealed message which is already transmitted to the external electronic device occurs, the processor is further configured to transmit at least one of a type of the user input and emphasis effect information designated in accordance with the type of the user input to the external electronic device with identification information of the sealed message.

7. The electronic device of claim 1, wherein, when a second content of the message is input, the processor is further configured to seal the sealed message with at least one of the first object and a third object corresponding to the first content of the sealed message such that at least a portion of a fourth object corresponding to the second content is not exposed.

* * * * *